United States Patent
Kinzenbaw et al.

(10) Patent No.: US 9,961,824 B2
(45) Date of Patent: May 8, 2018

(54) LIFT AND ROTATE AGRICULTURAL IMPLEMENT

(71) Applicant: KINZE MANUFACTURING, INC., Williamsburg, IA (US)

(72) Inventors: Jon Kinzenbaw, Williamsburg, IA (US); Robert Blackwell, Coralville, IA (US); Riley Lind, North Liberty, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days. days.

(21) Appl. No.: 15/133,812

(22) Filed: Apr. 20, 2016

(65) Prior Publication Data

US 2016/0302350 A1 Oct. 20, 2016

Related U.S. Application Data

(60) Provisional application No. 62/149,777, filed on Apr. 20, 2015.

(51) Int. Cl.
  *A01B 73/00* (2006.01)
  *A01B 73/06* (2006.01)
  *A01C 7/20* (2006.01)

(52) U.S. Cl.
  CPC ............ *A01B 73/005* (2013.01); *A01B 73/06* (2013.01); *A01C 7/208* (2013.01)

(58) Field of Classification Search
  CPC ....... A01B 73/00; A01B 73/005; A01B 73/06; A01C 7/208
  See application file for complete search history.

(56) References Cited

U.S. PATENT DOCUMENTS

| 4,083,411 A | * | 4/1978 | van der Lely | ....... A01B 33/087 172/117 |
| 4,137,852 A | * | 2/1979 | Pratt | .................... A01B 73/065 111/57 |
| 4,721,168 A | | 1/1988 | Kinzenbaw | |
| 5,346,019 A | * | 9/1994 | Kinzenbaw | ............ A01C 7/208 111/57 |

(Continued)

OTHER PUBLICATIONS

Kinze Manufacturing, Inc., PCT/US2016/028452 filed Apr. 20, 2016, "The International Search Report Adn the Written Opinion of the International Searching Authority, and the declaration", dated Jul. 15, 2016, 9 pages.

*Primary Examiner* — Matthew D. Troutman
(74) *Attorney, Agent, or Firm* — McKee, Voorhees & Sease, PLC

(57) ABSTRACT

An agricultural implement includes a toolbar that extends transverse to a tongue when in a field use configuration. The toolbar can be lifted and/or rotated relative to the tongue to transition between a field use and a transport use. A lifting assembly includes one or more actuators and linkage systems to lift the toolbar attached thereto in an arced manner in moving from a field use configuration to a transport configuration. A rotating mechanism can also include one or more actuators to rotate the toolbar about a pivot member. An anti-rotation link includes a member is connected to the toolbar and can be positioned at least partially within a groove to mitigate rotation of the toolbar, such as during the lifting of the toolbar.

10 Claims, 48 Drawing Sheets

(56) References Cited

U.S. PATENT DOCUMENTS

| | | | | |
|---|---|---|---|---|
| 5,579,849 A | * | 12/1996 | Houck | A01B 73/02 |
| | | | | 172/311 |
| 6,213,034 B1 | * | 4/2001 | Raducha | A01B 73/005 |
| | | | | 111/55 |
| 6,321,852 B1 | | 11/2001 | Pratt | |
| 6,378,621 B1 | * | 4/2002 | Graham | A01B 73/005 |
| | | | | 111/52 |
| 6,691,629 B2 | * | 2/2004 | Paluch | A01B 61/044 |
| | | | | 111/200 |
| 6,691,794 B2 | * | 2/2004 | Paluch | A01B 59/042 |
| | | | | 172/311 |
| 6,915,863 B2 | * | 7/2005 | Raducha | A01B 73/005 |
| | | | | 111/59 |
| 7,900,711 B2 | * | 3/2011 | Kinzenbaw | A01B 73/00 |
| | | | | 172/395 |
| 9,549,498 B2 | * | 1/2017 | Olivares | A01B 73/005 |
| 2003/0164126 A1 | * | 9/2003 | Paluch | A01C 7/208 |
| | | | | 111/57 |
| 2004/0149190 A1 | * | 8/2004 | Raducha | A01B 73/005 |
| | | | | 111/200 |
| 2007/0163790 A1 | * | 7/2007 | Ryder | A01B 76/00 |
| | | | | 172/210 |
| 2014/0000919 A1 | | 1/2014 | Bachman et al. | |
| 2015/0342111 A1 | * | 12/2015 | Meenen | A01B 73/005 |
| | | | | 414/550 |
| 2016/0128264 A1 | * | 5/2016 | Olivares | A01B 73/005 |
| | | | | 111/55 |

* cited by examiner

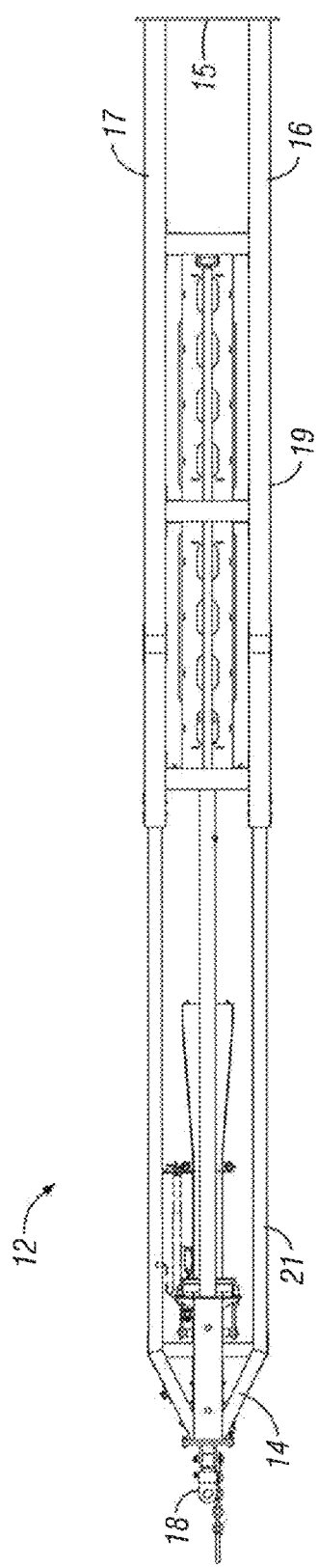
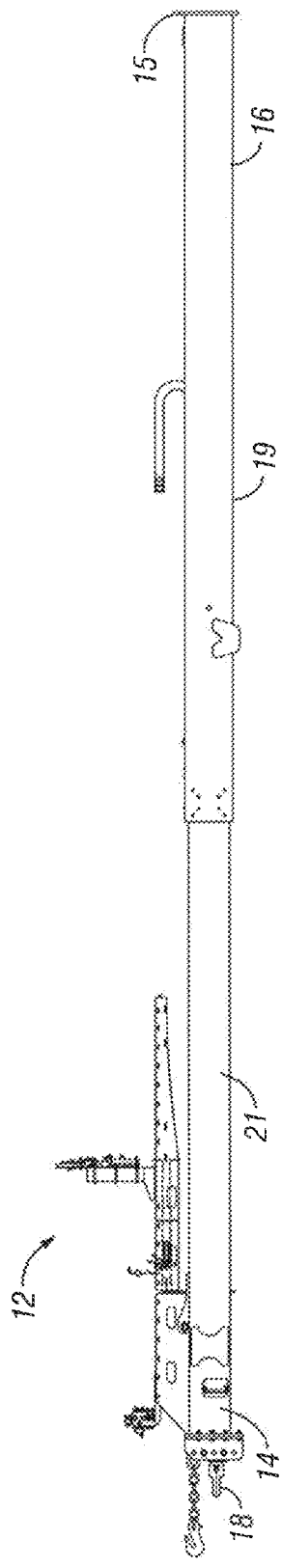

LIFT AND ROTATE AGRICULTURAL IMPLEMENT

CROSS-REFERENCE TO RELATED APPLICATIONS

This application claims priority under 35 U.S.C. § 119 to provisional application Ser. No. 62/149,777, filed Apr. 20, 2015, the contents of which are herein incorporated by reference in its entirety.

FIELD OF THE INVENTION

The invention relates generally to agricultural implements. More specifically, but not exclusively, the invention relates to improvements of an agricultural implement that lifts and rotates to transition from a field use to a transport use.

BACKGROUND OF THE INVENTIONS

Increased tractor horsepower has resulted in larger implements capable of planting or working a much wider swath in a single pass. Transport of these wide implements from a storage area to a field or from one field to another over roads has become an important design consideration. Some early planters required separate trailers for transport. In addition to the cost of these special-use transport trailers, these planters are limited in length by the practical requirements of having to load the implement on the trailer and to unload it. The time involved with the use of a separate trailer is increased because in loading the implement on the trailer and then in setting up the implement in the new field, the tractor must be unhitched from the implement and then hitched to the trailer, with the reverse procedure followed at the new site. This loss of time can be significant in view of the short time typically available when good planting conditions prevail, particularly when numerous fields must be planted using the same implement.

Other attempts to facilitate transport of larger implements include frames with pivoting wing sections on which row units are mounted which may be vertically folded. When folded, the implement is much greater in height, frequently causing problems when attempting to pass under bridges, through gates and into storage buildings. In addition, even with the two outer wing sections folded, because of the increasing size of agricultural implements, the fixed center section may also restrict transport and storage of the implement.

Still other attempts include lifting and rotating the wings about a pivot point generally in line with the tongue of the tractor. Lift and rotate planters are agricultural implements with wings extending transversely from a tongue when the planter is in a field use. A centralized actuator can lift the wings and attached row units during turning, and can lift further and rotate the wings substantially in line with the tongue for transport of the planter. This provides for a narrower implement that can be driven down most roads and that can pass under most bridges.

However, lift and rotate planters are not without problems. Due to the increased sizes of the wings, during lifting, they may tend to want to rotate or walk, with can increase the strain on the toolbar and components thereof. Furthermore, when the wings increase in length to increase the number of row units attached thereto, the amount of power required by the lifting actuator, as well as the length between the pivot point and the tractor need to be increased.

Therefore, there is a need in the art for an improved agricultural planter that provides for an increased width to increase the number of row units attached thereto, while providing improved systems, apparatus, and methods for lifting and rotating the wings of the planter to allow for turning and transition from a field use and a transport configuration of the planter.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide a lift and rotate planter with increased width.

It is yet another object, feature, and/or advantage of the invention to provide a lift and rotate planter that decreases the stress on the toolbar and rotating actuator when the wings are in a turning configuration.

It is still another object, feature, and/or advantage of the invention to provide a lift and rotate planter that includes a telescoping tongue to allow for wings of greater length to be rotated generally in line with the tongue while in the transport configuration.

It is a further object, feature, and/or advantage of the invention to include the use of multiple actuators working in tandem to lift the wings and row units of the planter.

It is still a further object, feature, and/or advantage of the invention to include an anti-rotation link that includes substantially the same travel as a four bar linkage used to life the wings of the planter.

It is yet a further object, feature, and/or advantage of the invention to include fertilizer tanks positioned in saddles connected to the telescoping tongue of the planter such that the tanks allow for clearance of the rotating wings, while also meeting the fertilizer needs of the planter.

These and/or other objects, features, and advantages of the invention will be apparent to those skilled in the art. The invention is not to be limited to or by these objects, features and advantages. No single embodiment need provide each and every object, feature, or advantage.

The invention includes methods, systems, and apparatus for providing support of a lift and rotate style agricultural planting implement, which may also be referred to as a lift and rotate planter. The planter includes a tongue, which includes a hitch for attaching to a tow vehicle. The tongue extends generally away from the hitch. According to some aspects of the invention, the tongue is a double sectioned, telescoping tongue, with first and second telescoping members running side by side and combining at a wye configuration at or near the hitch. The double telescoping members allow for the length of the tongue to be extended to allow the planter toolbar to be in a transport configuration, and retracted to allow the planter toolbar to be in a field use configuration. Using multiple members side by side increases the strength and rigidity of the tongue. However, only one tongue member can be used as well.

A frame with a lifting and rotating assembly and transport wheels is positioned at the rear of the tongue. The lifting assembly comprises one or more actuators and linkage systems to lift the toolbar attached thereto in an arced manner in moving from a field use configuration to a transport configuration. The rotating mechanism can also include one or more actuators to rotate the toolbar about a pivot member.

The linkage arms of the lifting assembly can be configured to route hoses, cables, and other components therethrough. The linkages, which can include upper and lower linkages, will allow the components to have slack when needed, but also to take up at least some of the slack so that the cables, hoses, and other components do not interfere with or get in the way during rotation and/or lifting of the toolbar.

The toolbar extends generally transverse the tongue when in a field use configuration, and can be rotated approximately 90° to position the toolbar in a transport configuration. The toolbar can include wing sections, and, according to some aspects of the invention, comprises a front, upper, and rear bar in a triangular manner. An arched member can connect the bars, and wheels can be positioned at least partially within or under one or more of the arches and/or bars.

Row units can be attached to the front bars in push manner and/or to the rear bars in a pull manner. The row units can be generally any type and can include any type of seed meter or meters. Furthermore, hoppers can be included to deliver seed to the meters of the row units.

To aid in prevention and/or mitigation of rotation or oscillation of the wing sections of the toolbar when in the field use configuration, such as in a turning configuration, an anti-rotation link and system can be included. The anti-rotation link is a linkage arm extending generally from the tool bar to a guide of the frame. An actuator is also connected to the arm. The actuator and guide aid in the prevention and/or mitigation of the oscillation to attempt to keep the toolbar sections from rotating relative to the frame and/or tongue. Furthermore, when the toolbar is lifted, the anti-rotation linkage arm has a geometry that is the same as the lift linkage arms such that it will follow generally the same arced path of the linkage arms. This is advantageous to the lifting, anti-rotation, and general function of the planter when between field and transport configurations such that the anti-rotation link will not interfere with other components and will always be repositioned in the guide to aid in the anti-rotation of the toolbar.

Furthermore, the invention includes support tanks that are attachable to the telescoping tongue members to house one or more tanks, such as fertilizer tanks. The tank supports can be attached in a saddle-like manner, where they extend generally out from the side of the tongue members. They are configured to dip slightly downward to keep the height of the tanks in the supports at a minimum, and below the threshold needed for clearance for the toolbar and attached components when rotating to the transport configuration.

BRIEF DESCRIPTION OF THE DRAWINGS

FIG. 39 is a bottom plan view of the tongue of FIG. 37.

FIG. 40 is a side elevation view of the tongue of FIG. 37.

Figure 1:
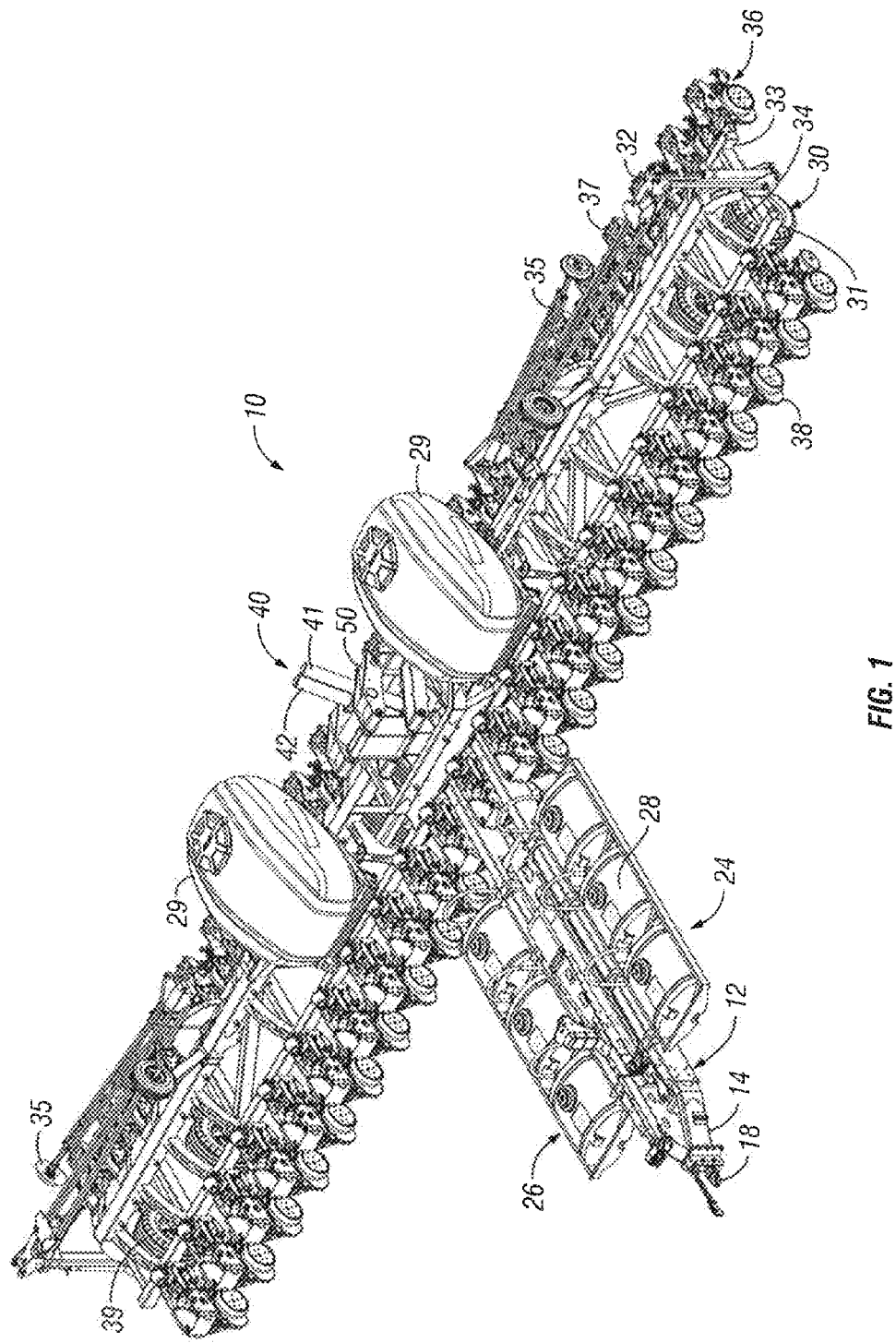
FIG. 1 is a perspective view of an agricultural planter implement in a planting configuration according to aspects of the invention.
Figure 2:
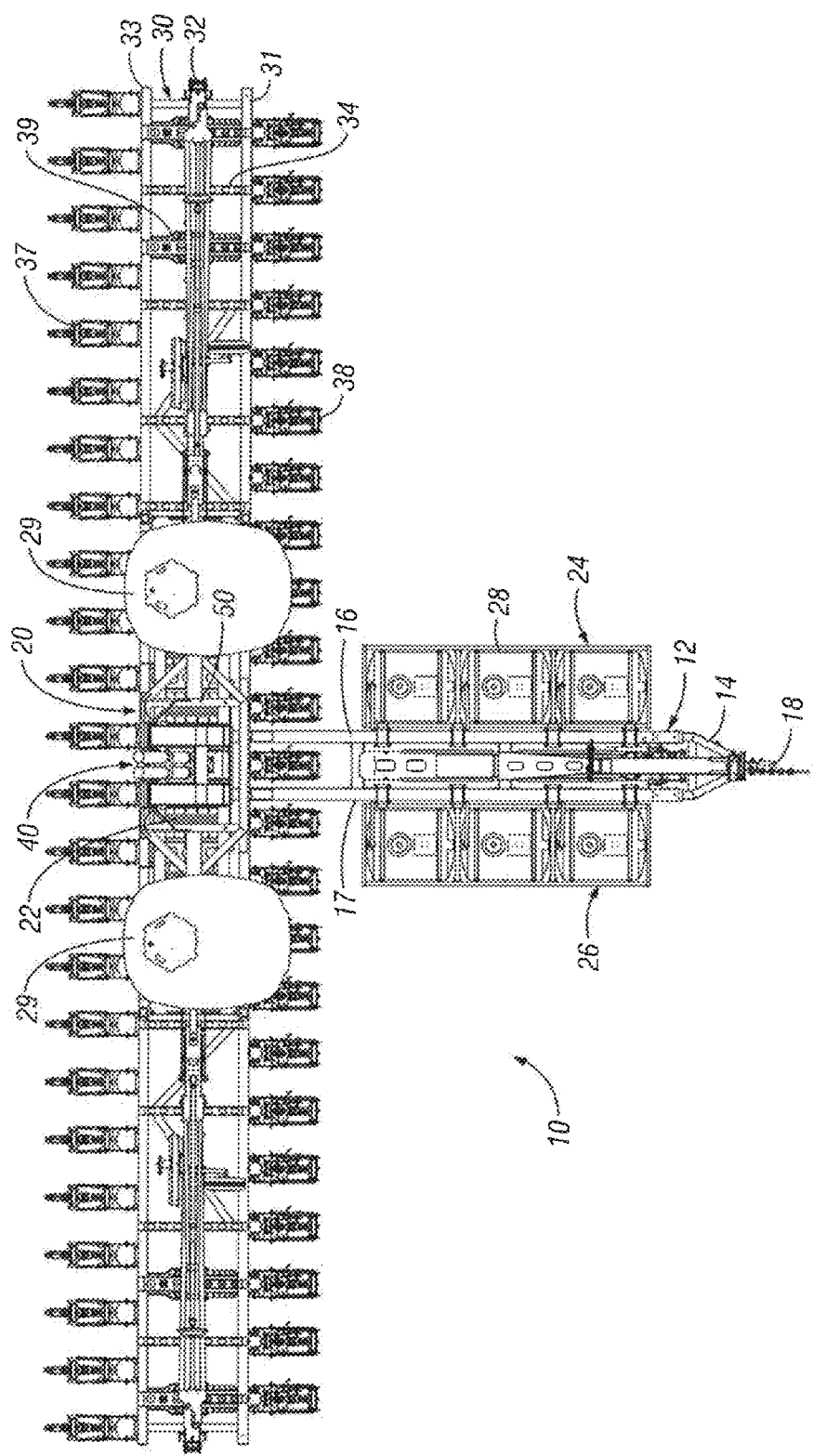
FIG. 2 is a top plan view of the agricultural planter implement of FIG. 1.
Figure 3:
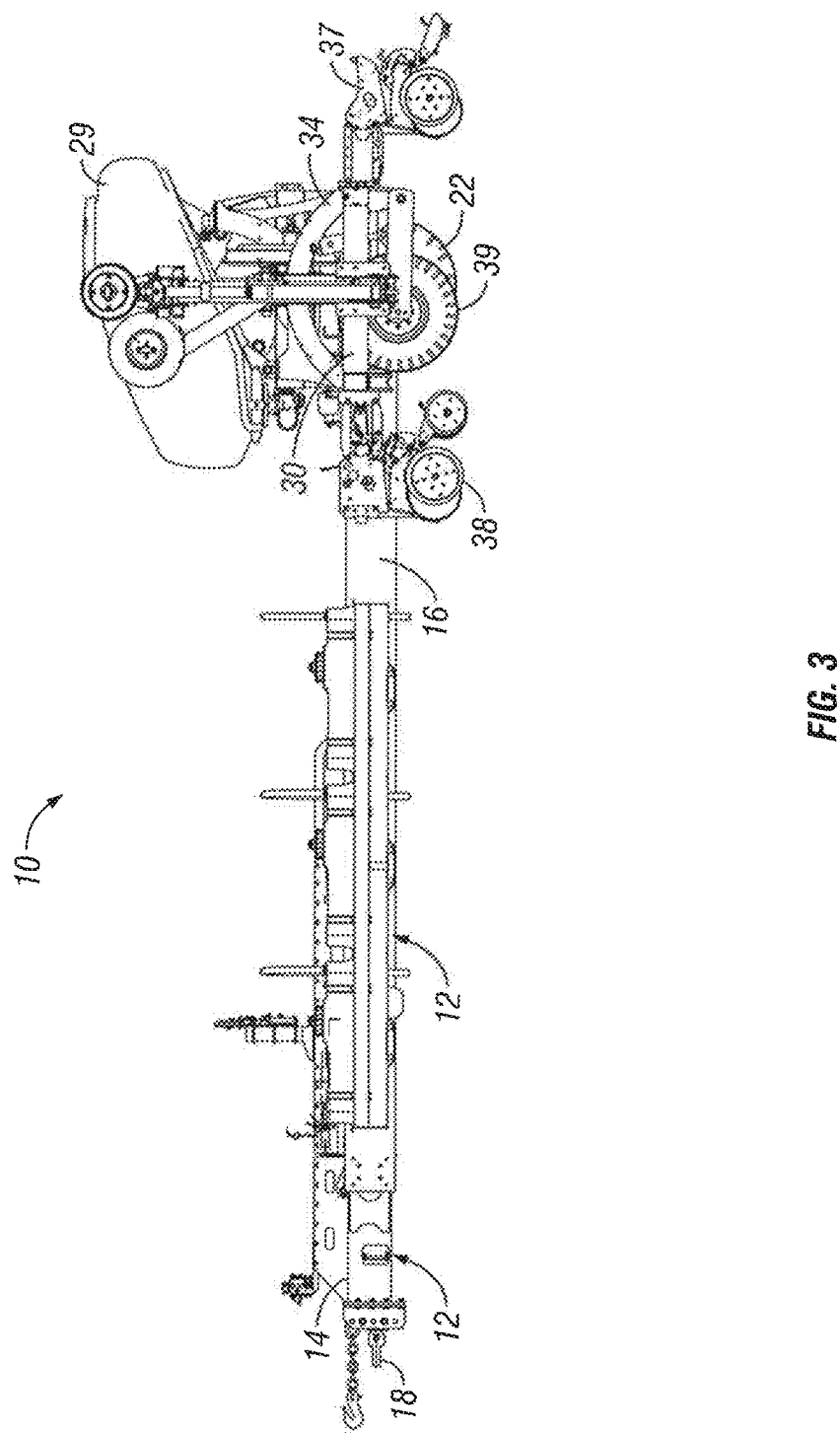
FIG. 3 is a side elevation view of the planter of FIG. 1.
Figure 4:
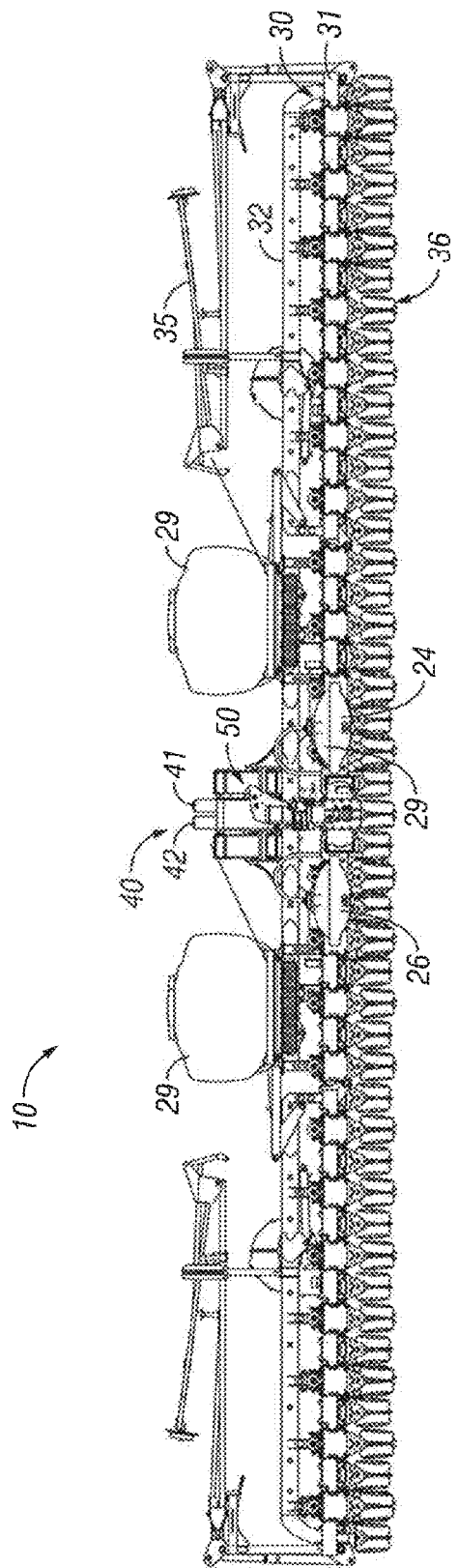
FIG. 4 is a front elevation view of the planter of FIG. 1.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The invention is directed towards an agricultural planting implement, which may also be known as a planter. The planter is of the type which includes a field use configuration, a turning configuration, and a transport configuration. For example, when in the field use and turning configurations, the planter 10 will include a tongue member extending from a tow vehicle, such as a tractor, with a toolbar with row units that is generally transverse to the tongue. The same general configuration will appear when the planter is in a turning configuration, with the exception that the row units will be at least partially lifted off the ground to allow for the planter 10 to be turned within a field with reduced resistance. However, to transition the planter 10 to a transport configuration, the toolbar and row units attached thereto will be lifted above the ground and to a height where the components of the toolbar are at least partially above the tongue. Next, a rotating mechanism will rotate the toolbar approximately 90 degrees to at least partially align the toolbar with the tongue. Therefore, the planter of the invention may be known as a lift and rotate planter wherein the toolbar with row units are lifted and rotated to transition from a field use configuration to a transport configuration. In opposite, to transition back to the field use configuration, the toolbar is rotated the opposite way approximately 90 degrees and then lowered after clearing the tongue to allow the row units attached to the toolbar to engage the ground.

Furthermore, as will be understood, the planter 10 of the invention includes a substantially longer toolbar than is presently known. This allows for more row units to be included with the toolbar of the planter, which allows for fewer paths to be taken during planting of a field. Therefore, in order to allow for the length of the toolbar to clear the tongue and to be aligned thereto when in the transport configuration, the tongue will be of the telescoping type. The tongue includes components that can telescope inwards and outwards to extend or retract the length of the tongue relative to a position of the tow vehicle, which will allow the length of the toolbar to come to a rest generally above said tongue, while not interfering with the tow vehicle.

As is known, the rotation of the toolbar to align it with the tongue in a transport configuration will provide numerous advantages. For example, the transport configuration will allow for the planter to be much narrower such that it can travel along roads without causing too many problems. Furthermore, having the toolbar positioned generally directly above the tongue in the transport configuration will keep the height of the planter at a minimum, such that it can pass under most ridges during transport.

Therefore, FIGS. 1-4 disclose a planter 10 according to aspects of the invention. The planter 10 as shown in FIGS. 1-4 is in a generally field use or turning configuration. The planter 10 includes a telescoping tongue 12 having a first end 14 and an opposite second end 15. As mentioned, the tongue is telescoping to allow for the length of the tongue to be varied depending on the use or configuration of the planter 10. The telescoping of the tongue may be shown best in FIGS. 33-40. The tongue, as is shown in the Figures, may include dual portions, which may be also known as first portion 16 and second portion 17. The portions are separate beginning at the second end 15 of the tongue 12. The tongues converse generally at the first end 14 in a wye configuration to combine at or near the hitch 18. The hitch 18 may be any type of hitch for attaching the planter 10 to a tow vehicle, such as a tractor, truck, or other vehicle. The use of first and second telescoping tongue member 16, 17 allows for the tongue to be more sturdy and/or strong to both pull and support a toolbar 30 such as is included in the figures. However, it should be appreciated that not all embodiments of the invention require the use of first and second telescoping tongue members, and instead, a single telescoping tongue member may be utilized as part of the invention. For example, a wye configuration may extend from the frame 20 of the planter 10 at the second end 15 and extend the length of the tongue member 12 to the first end 14 and exterminating at the hitch 18. Such a telescoping tongue will still allow for the length of the distance between the hitch 18 and the second end 15 of the tongue to be varied according to need.

Figure 33:
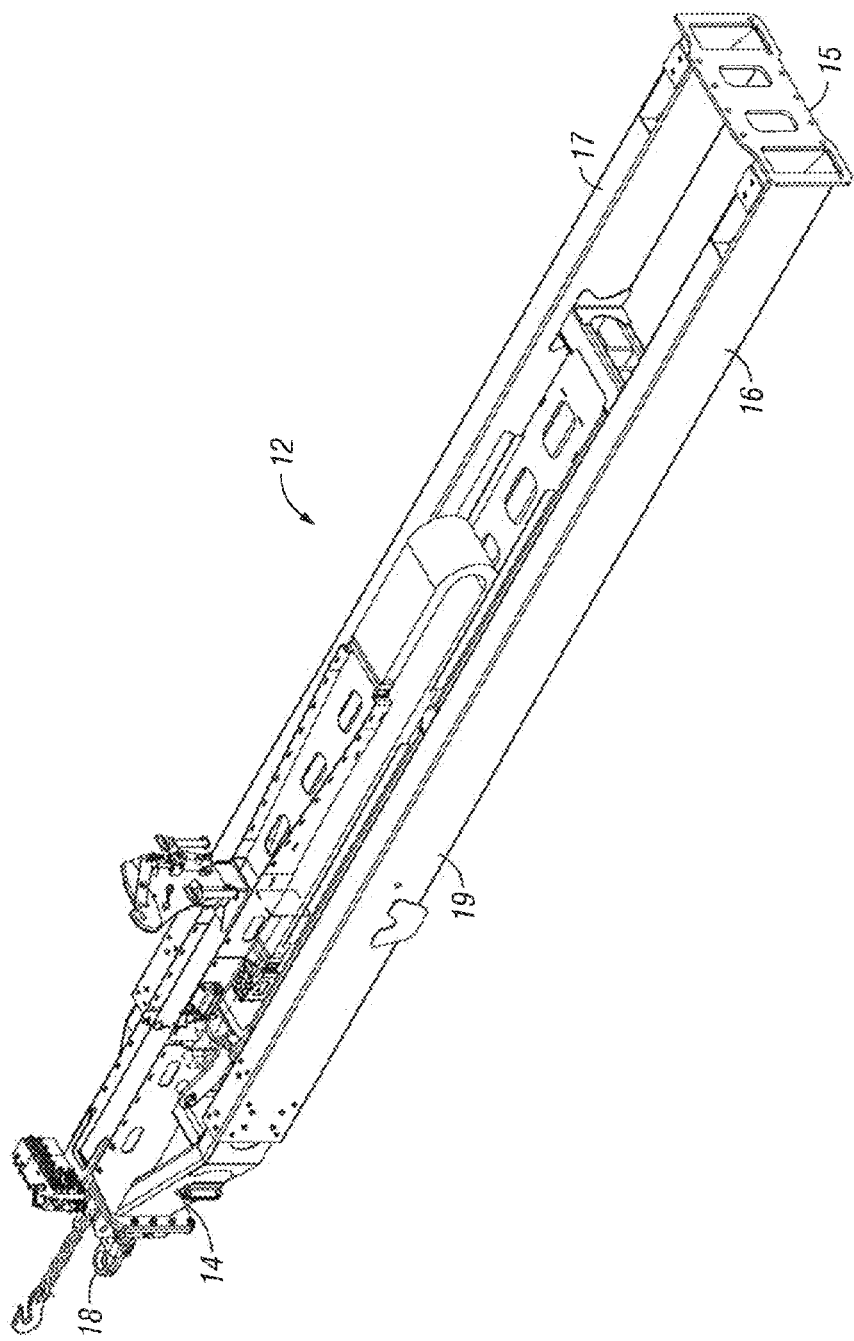
FIG. 33 is a perspective view of a tongue for use with an agricultural planter in a field use configuration according to aspects of the invention.
Figure 34:
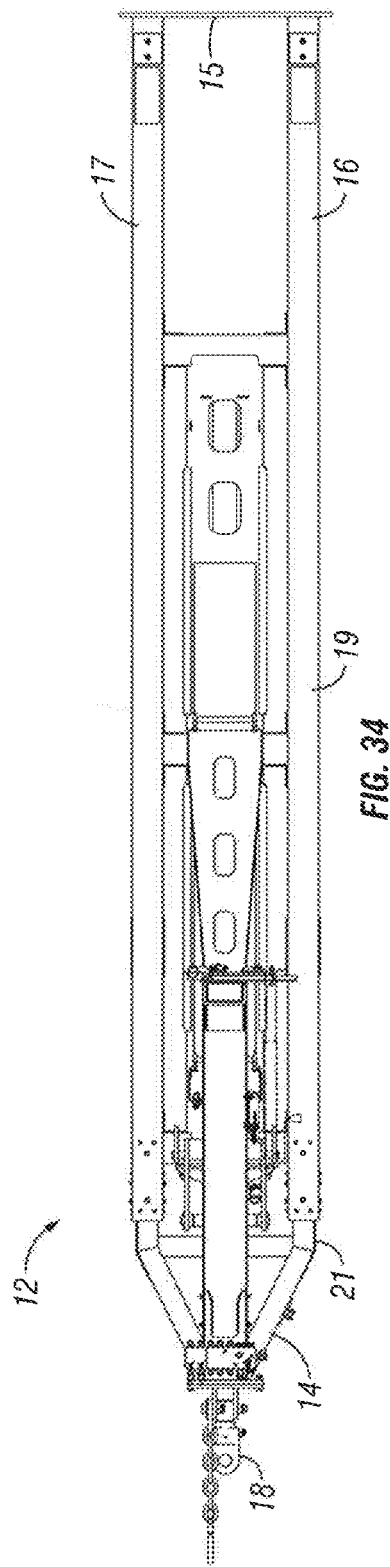
FIG. 34 is a top plan view of the tongue of FIG. 33.
Figure 35:
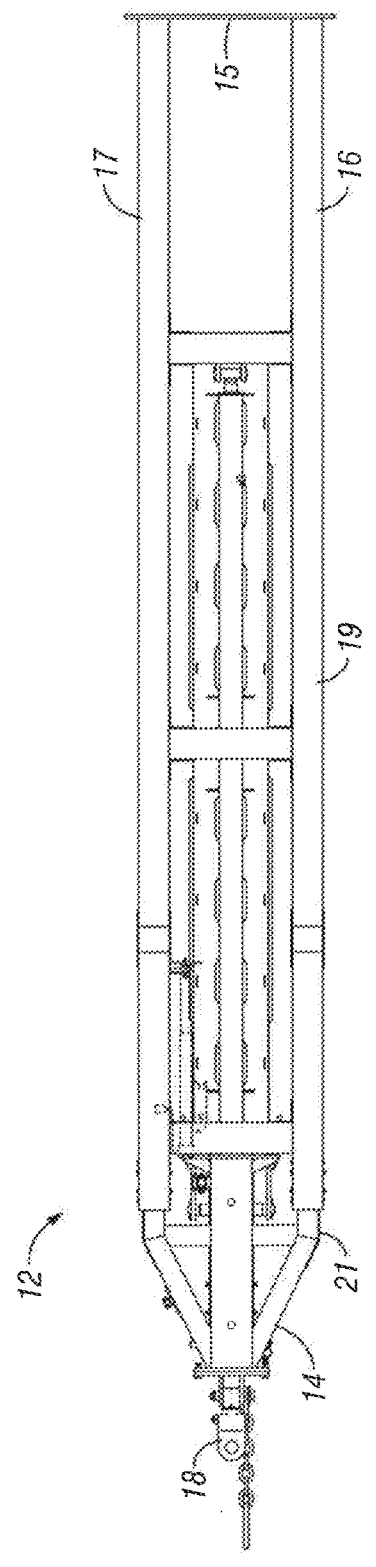
FIG. 35 is a bottom plan view of the tongue of FIG. 33.
Figure 36:
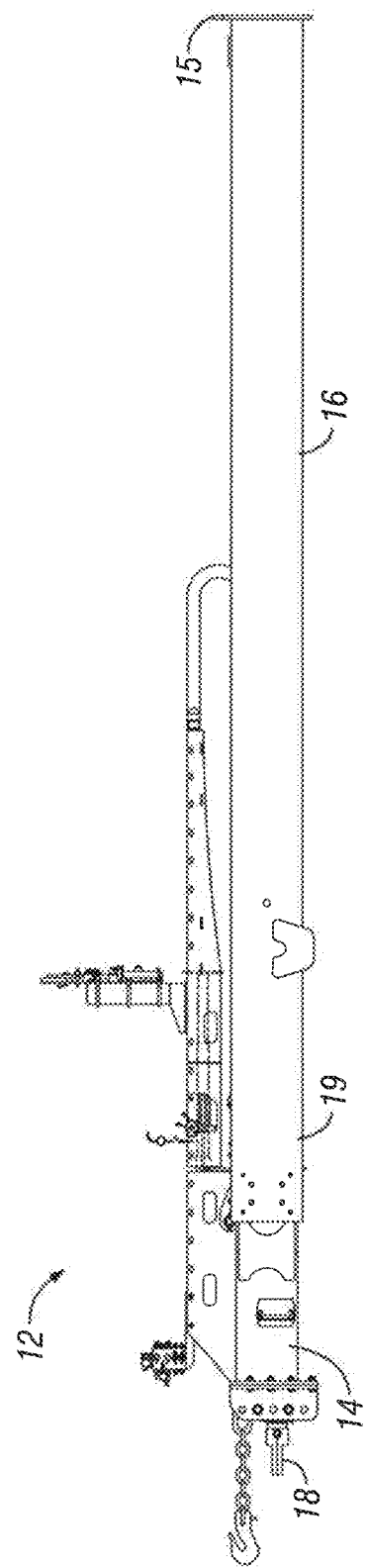
FIG. 36 is a side elevation view of the tongue of FIG. 33.
Figure 37:
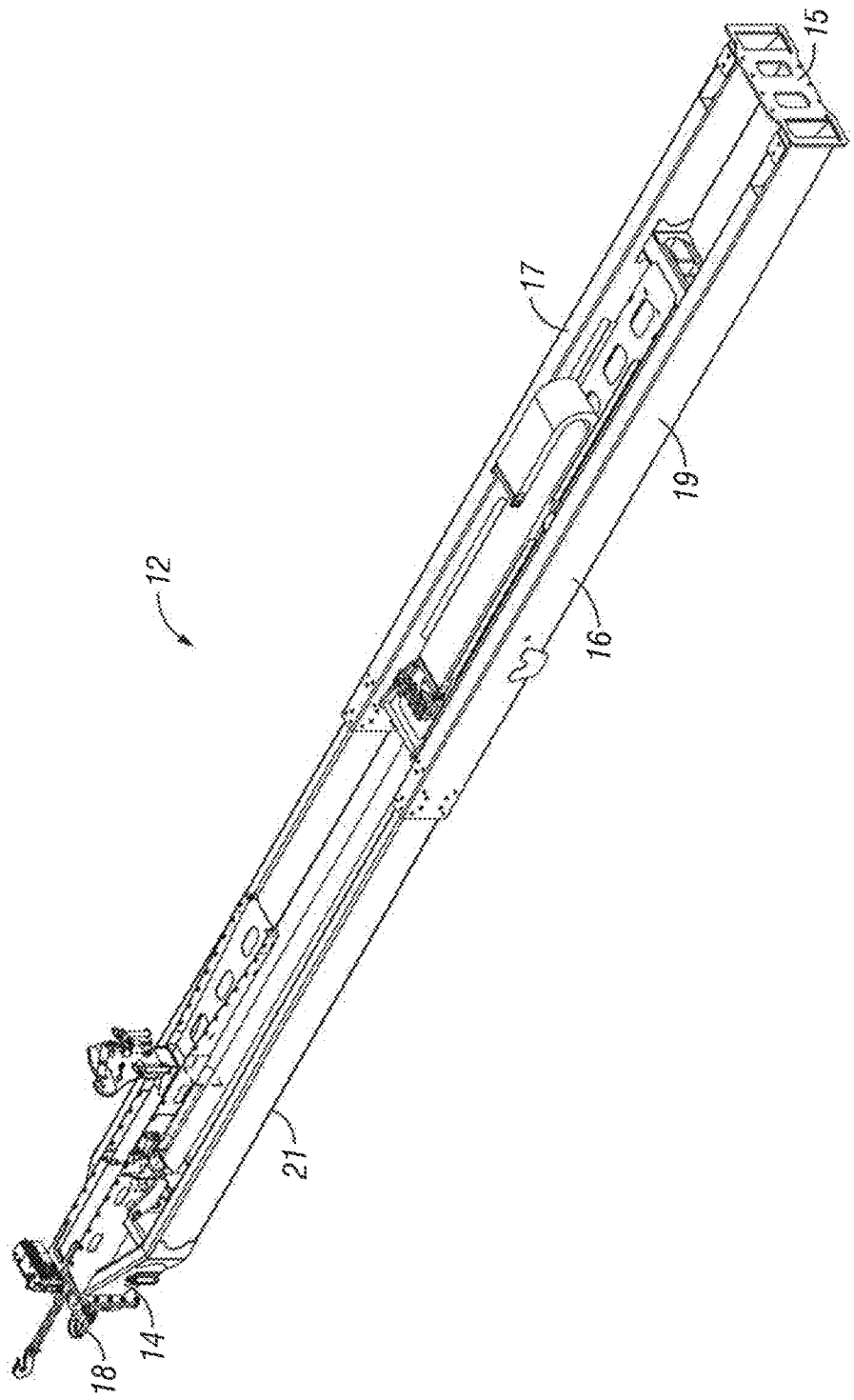
FIG. 37 is a perspective view of a tongue for use with an agricultural planter in a telescoped configuration according to aspects of the invention.
Figure 38:
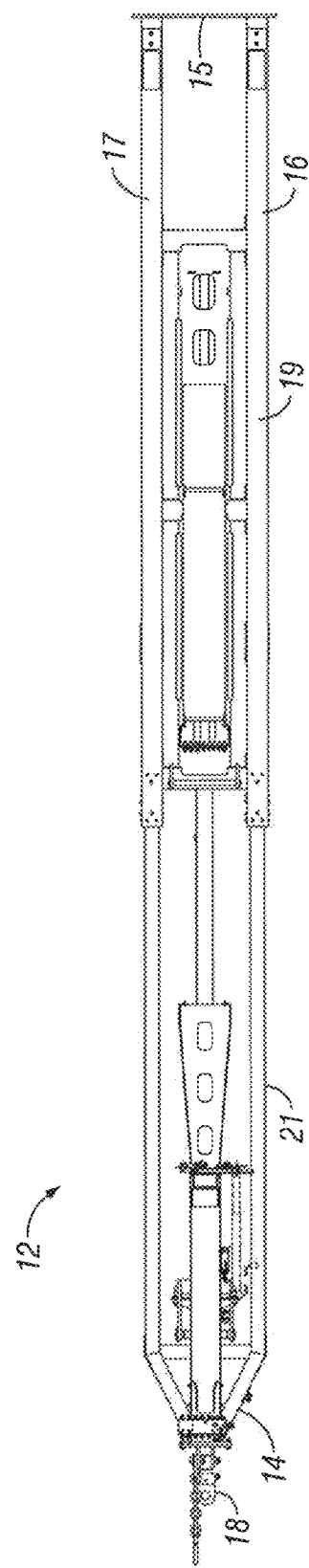
FIG. 38 is a top plan view of the tongue of FIG. 37.

As is shown throughout the figures, the first and second tongue member 16, 17 include an outer member 19 and an inner member 21. When first and second tongue members are utilized, it should be appreciated that the members may be generally identical and/or mirror images of one another. Therefore, as is shown in FIG. 33, the tongue is in its retracted position such that substantially all or most of the inner section 21 is positioned within the outer section 19 of the tongue member 16, 17. This is also shown in FIGS. 1-4, which include all or most of the components of a planting implement 10. The tongue may be in the retracted position when the planter 10 is in the field use and/or turning configuration. As shown in FIG. 1, the field use configuration of the planter 10 is such that the toolbar 30 is generally transverse the longitudinal direction of the tongue 12. Therefore, to reduce the distance between the hitch 18 and the toolbar 30, which will aid in controlling the pulling of the planter 10, including turning thereof, the tongue 12 will be in a retracted position. This is further shown in FIGS. 33 through 36.

However, when the planter is to be transitioned from the field use configuration to a transport configuration, the length of the sections of the toolbar 30 will be such that simply lifting and rotating the toolbar would cause a portion of the toolbar to contact the tow vehicle, as the distance between the tow vehicle and the second end 15 of the tongue 12 would not be sufficient for such rotation. Therefore, the tongue 12 is a telescoping tongue such that the length of said tongue can be lengthened. This is shown best in FIGS. 37-40. As can be seen in the figures, the tongue 12 has been extended such that a greater portion amount of the inner section 21 of the tongue portion 16, 17 is outside of the outer section 19. This increases the distance between the hitch 18 and the second section or end 15 of the tongue 12.

To aid in extending and retracting the inner section 21 relative to the outer section 19 of the tongue sections 16, 17, a mechanism may be included as is shown on an upper portion of the tongue near the first end 14. The mechanism may include hydraulics, electronics, pneumatics, or the like, to move the inner section 21 relative to the outer sections 19 of the tongue members 16, 17. This will aid in increasing and decreasing the length of the tongue 12. It should be appreciated that generally any mechanism may be used to extend or retract the length of the tongue sections, including those which are known in the art.

Furthermore, while a telescoping tongue has been shown and described, it is to be appreciated that when the length of the tongue is sufficient in relation to the length of at least one-half of the toolbar 30, the tongue need not be telescoping. For example, if the width of the toolbar 30 is such that a simple lifting and rotation thereof would not include interference between the tool bar and the tow vehicle, the tongue need not be extended or retracted, and a set length of tongue may be utilized. Therefore, it is to be appreciated that the present invention need not include a telescoping tongue in all embodiments thereof.

Referring back to FIGS. 1-4, at the second end 15 of the tongue is a frame section 20. The frame section 20 is a rigid member and includes such components as transport wheels 22 connected thereto, as well as a toolbar lifting assembly 40 and a rotating mechanism 53. The transport wheels 22 are wheels that can maintain contact with the ground in most situations and/or configurations. As can be seen in the figures, such as in FIGS. 5-8, when the planter 10 is in a transport configuration, the transport wheels 22 will be the support of the planter 10 opposite the hitch 18 of the planter 10, such that the wheels 22 are what support the weight of the planter 10 during transport thereof.

Also connected to the frame 20 and extending generally transverse thereto in FIGS. 1-4 is a toolbar 30. The toolbar 30, as is shown in the figures, includes multiple components. For example, the toolbar 30 includes a front or first bar 31, an upper or second bar 32, a rear or third bar 33, as well as an arched portion 34 extending generally between the front and rear portions and the upper portion. The toolbar 30 is not to be limited to the exact configuration shown in the figures, however, and is to be generally known as a toolbar for supporting such elements such as row units, markers, additional ground support tires, and the like. For example, as is shown in FIGS. 1-4, the planter 10 includes a plurality of row units 36. These row units 36 include a plurality of pulling or rear units 37 which are operatively attached to the rear bar 33 of the toolbar 30. Such row units may be attached in any way, such as by the use of four bar linkages, as is shown and described in U.S. application Ser. No. 13/829, 726, which is hereby incorporated by reference in its entirety. Likewise, the planter 10 may include a plurality of push or front row units 38, which are shown to be connected to the front bar 31 of the toolbar 30. Therefore, the planter 10 as is shown in the figures may be a push/pull type planter in which there are both push row units 38 and pull row units 37. The inclusion of push and pull row units allows for a greater number of row units to be attached to the toolbar 30 such that more seeds can be planted in a single path with the planter 10. However, the invention should not be limited to such a configuration, in the use of only push and/or only pull row units is intended to be included as part of the invention.

Furthermore, the middle or upper bar 32 of the toolbar 30 is shown to be raised above the front and rear bars 31, 33. This is connected by one or more arch-type members 34, as is shown in the figures. The inclusion of the upper bar 32 and arch members 34 allows for the re-positioning of the transport wheels 39 of the planter 10. The transport wheels 39 are operatively connected to the toolbar 30 to allow for the wheels to contact the ground when in a field use configuration, such as that shown in FIGS. 1-5. Positioning the wheels between the front and rear row units 38, 37 allows for greater stability of the planter 10, during the field use configuration of the planer 10. However, to provide greater rigidity and stability for the construction of the toolbar 30, the inclusion of the middle bar 32 above the wheels and connected by the arch 34 still provides clearance for the wheels 39 relative to the toolbar 30.

Figure 41:
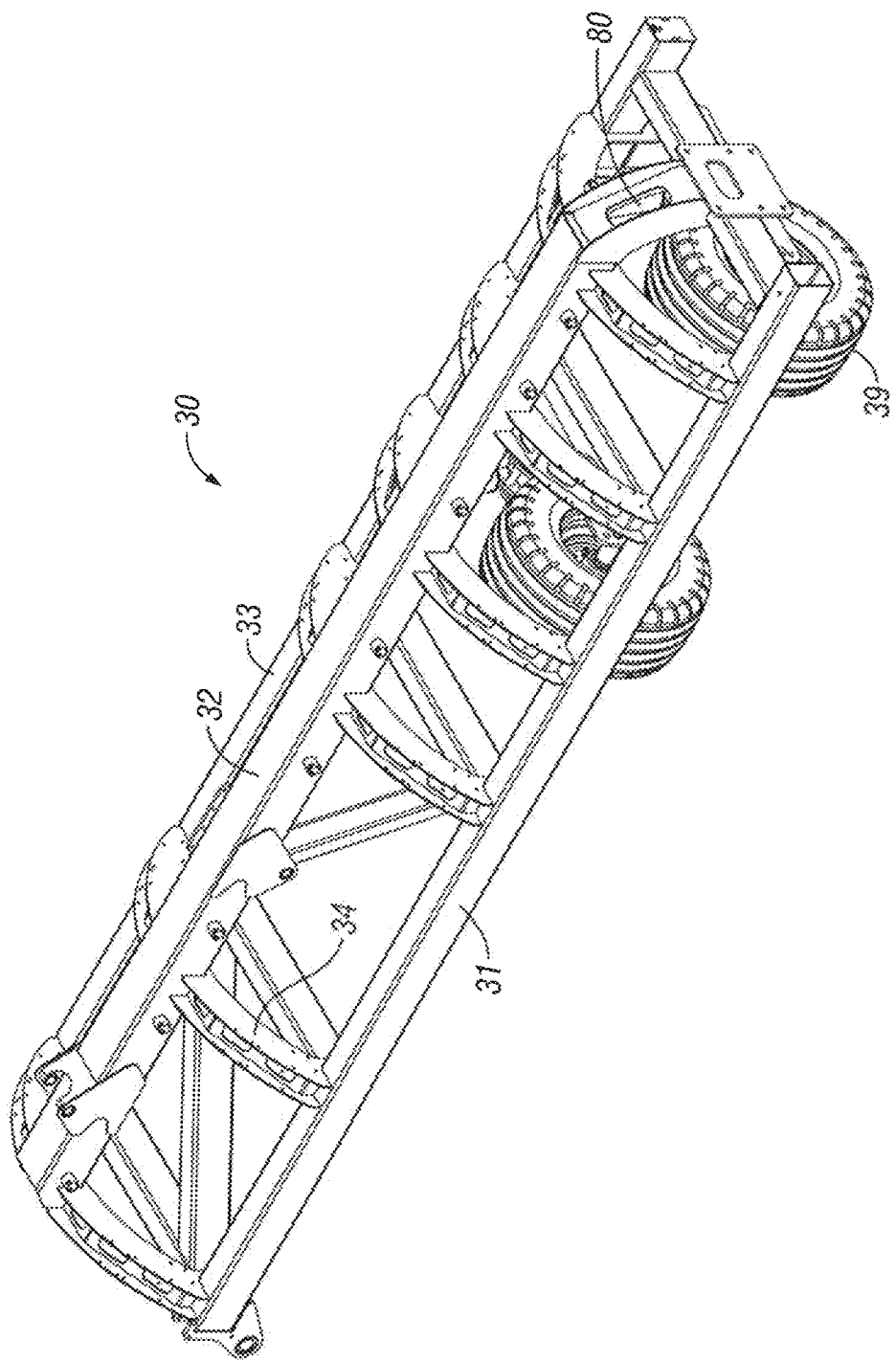
FIG. 41 is a perspective view of a portion of a wing toolbar of an agricultural planter according to aspects of the invention.
Figure 42:
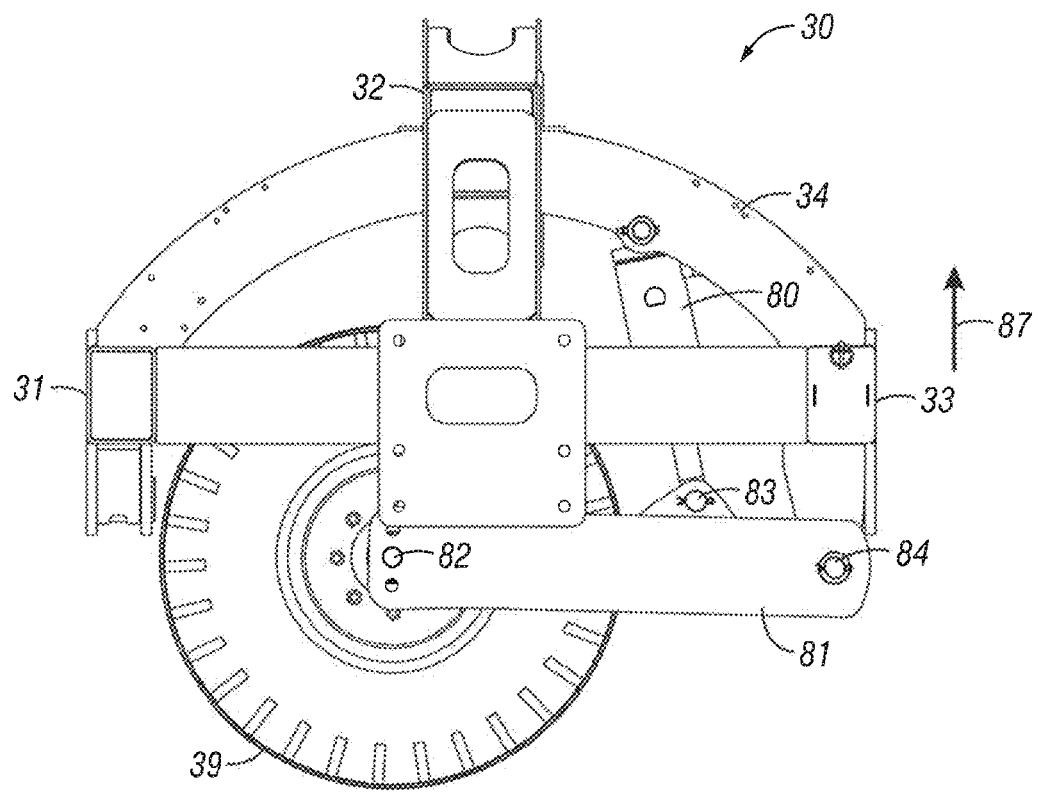
FIG. 42 is a side elevation view of the wing toolbar of FIG. 41.

Furthermore, as is shown in FIGS. 41 and 42, the wheels 39 can be connected to the toolbar 30 via a linkage 81 that also includes an actuator 80 operatively connected between the linkage 81 and an arch portion 34 of the toolbar 30. The actuator 80, as will be understood, allows for the toolbar 30, and thus row units 36 to be at least partially lifted off the ground, such as when in a field turn configuration. For example, as is shown in FIG. 42, the linkage 81 is connected at a point 82 coinciding with the axle of the wheel 39. The linkage 81 extends to have a connection point 83 connecting to a rod of the actuator 80. There is also a connection point 84 of the linkage 81 which connects to the rear bar 33 of the toolbar 30. Extending the rod of the actuator 80 will cause the wheel 39 be pushed towards the ground. However, pushing the wheel 39 towards the ground will compact the ground to a point wherein the movement of the actuator 80 will be in an upwards manner, such as that shown by the arrow 87 in FIG. 42. This is due to the connection of the connection point 83 and connection point 84 of the linkage 81. Continuing to extend the actuator 80 will cause the components of the toolbar 30, including the first bar 31, second bar 32, third bar 33, and arch 34 upwards in the direction of the arrow 87. As the row units 36 are connected to the components of the row unit 36, they will be raised off the ground as well. However, the raising of the row units 36 need only be enough to lift the portions of the row unit 36 out of engagement with the ground. While the row units 36 are not in engagement with the ground, it will be easier for the planter 10 to be turned via the tow vehicle, as substantially the only portions of the planter 10 in contact with the ground will be the ground support tires 39 and transport wheels 22. Once the turning of the planter 10 has been completed, the rod of the actuator 80 can be retracted into the housing such that the toolbar 30 and attached row units 36 will be lowered back into contact and engagement with the ground for further planting.

Referring back to FIGS. 1-4, still additional components of the planter 10 include markers 35 extending from ends of the toolbar 30. The markers 35, as is known, can be used to aid in determining where the edge or boundary for planting is.

Additionally, the figures show the inclusion of central hoppers 29 for holding one or more varieties, hybrids, or types of seed to be planted by the row units 36. For example, the row units 36 of the planter 10 may be of any type. For example, the row units and/or seed meters associated therewith may be of the type that are described in U.S. application Ser. Nos. 13/829,726, 14/478,222, 14/619,758, and/or 14/592,965, which are all hereby incorporated by reference in their entirety. This includes electrically driven seed meters, hydraulically driven seed meters, multi-hybrid type seed meters, and the like. However, it is to be appreciated that these are not the only types of seed meters, row units, seed delivery systems, and the like that are contemplated for use, and it is to be appreciated that generally any type, style, and/or configuration of seed meter, row unit, linkage connection, seed delivery system, down force, and the like can be used and included in the planter 10 of the invention.

Furthermore, while not explicitly shown, the planter 10 may include the use of an air seed delivery system, which is shown and described in U.S. application Ser. No. 12/829,654, which is also hereby incorporated by reference in its entirety. Therefore, it is to be appreciated that any type of planting system, including hoppers, row units, seed meters, seed delivery systems, and the like may be included and used with the planter 10 according to aspects of the invention.

Figure 9:
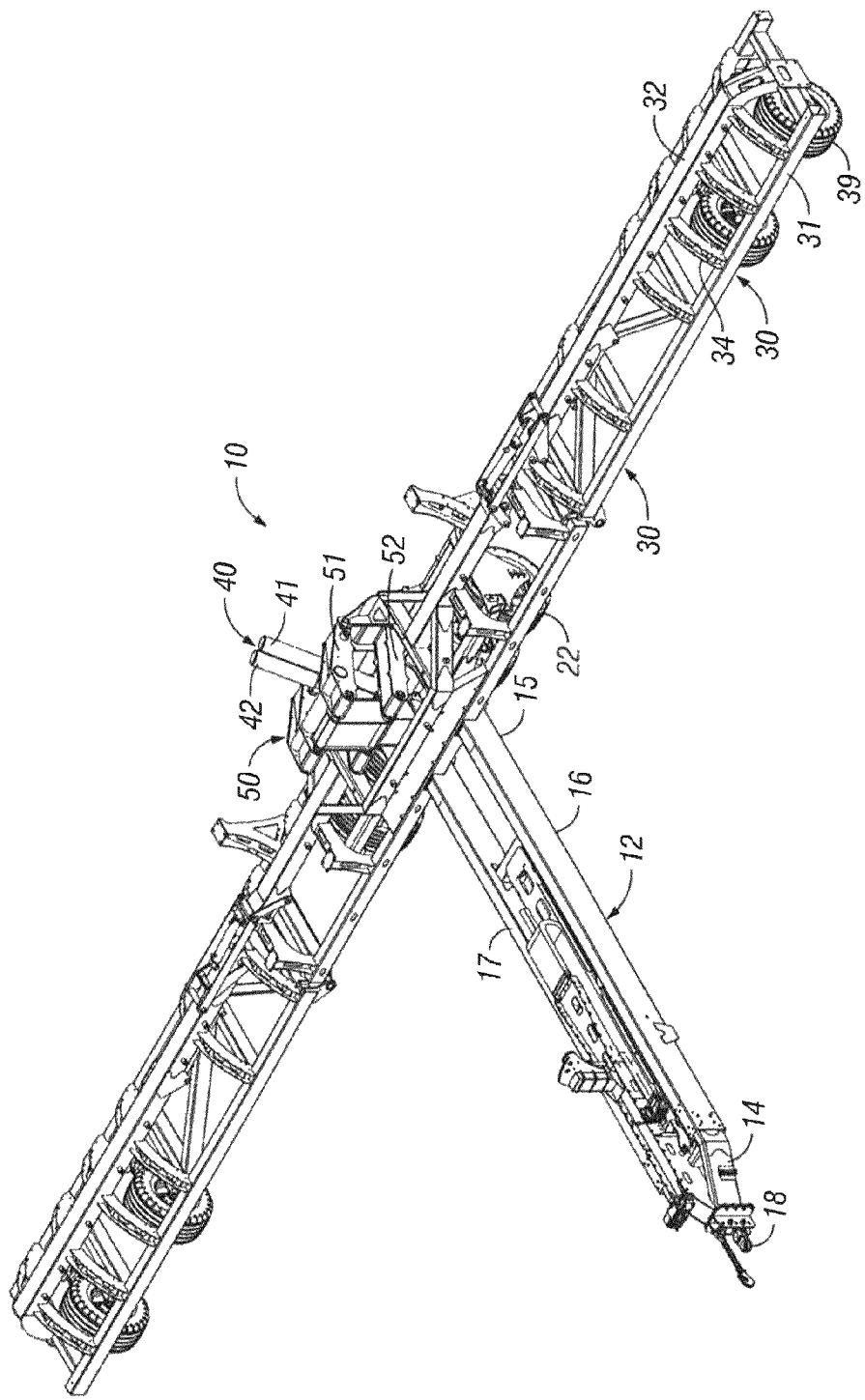
FIG. 9 is a perspective view of a frame and toolbar of an agricultural planter implement in a planting configuration according to aspects of the invention.
Figure 10:
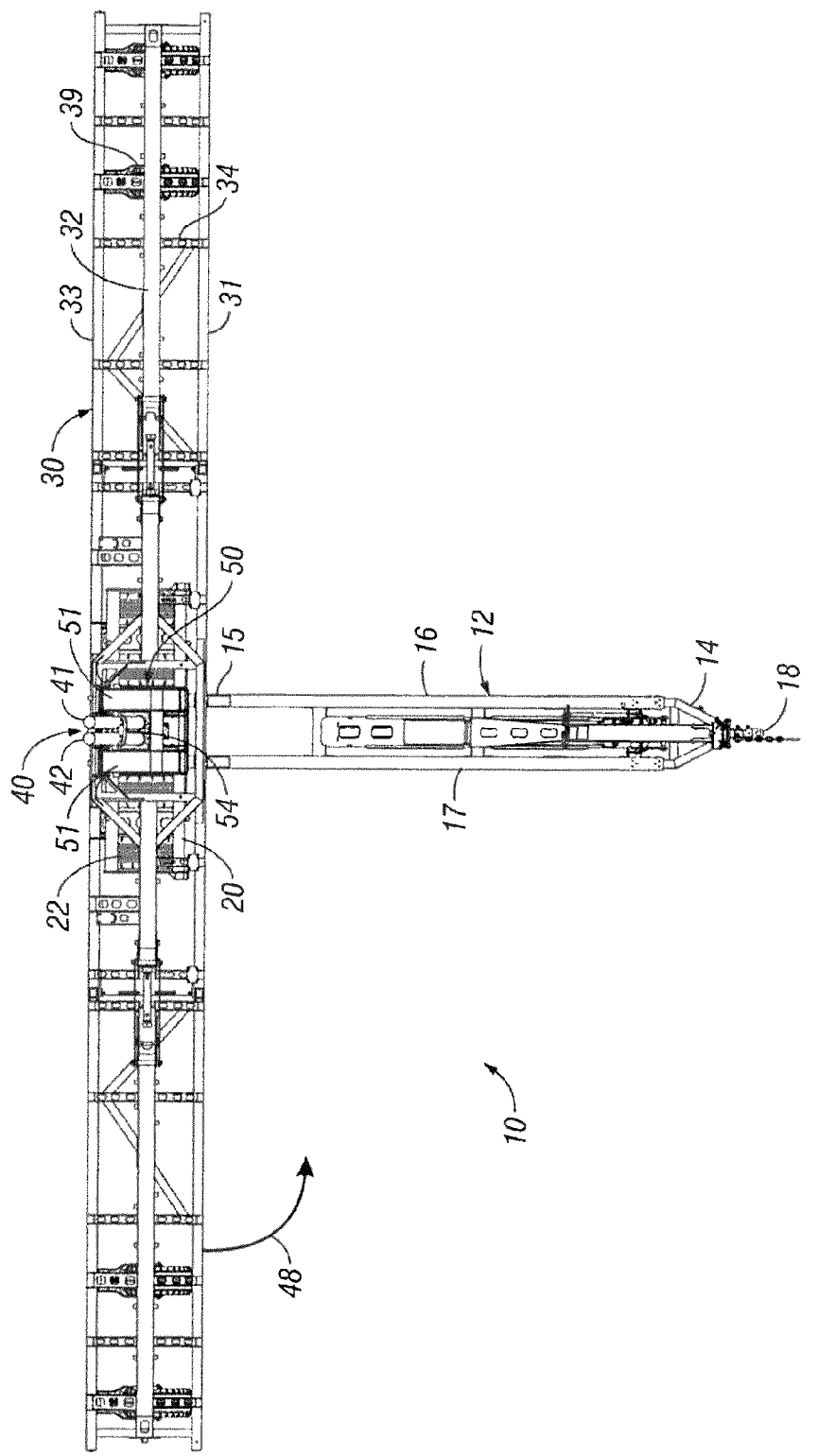
FIG. 10 is a top plan view of the planter of FIG. 9.

The planter 10 in the field use configuration is also shown in FIGS. 9-12 and 17-19. FIGS. 9-12 and 17-19 show elements of the planter 10 without all of the elements shown in FIGS. 1-4. For example, the row units 36 have been removed. In addition, the markers 35 and bulk hoppers 29 has also been removed to show the tongue 12 and toolbar 30 in more detail. For example, FIGS. 9 and 10 show the tongue in greater detail as it attaches to the frame 20 and toolbar 30.

However, additional figures included in the present disclosure show the planter 10 after it has been transitioned from the field use configuration to the transport configuration. For example, the planter 10 with all elements in the transport configuration is shown in FIGS. 5-8. As is shown in FIGS. 5-8, the toolbar 30 and all components attached thereto have been lifted above the height of the tongue 12 and rotated approximately 90 degrees, such as in the direction of the arrow 48 in FIG. 10. Such rotation can be accomplished by a rotating mechanism 53 wherein one or more actuators operatively positioned and attached to the frame 20 is extended or retracted to rotate the toolbar 30 and all components attached thereto in the direction of the arrow 48. Therefore, a pivoting pillar or cylinder can also be included at the frame 20 and connected to the toolbar 30 to provide for the rotation of the toolbar 30 relative to the tongue 12 and the frame 20.

To transition the planter 10 from the field use configuration to the transport configuration as is shown in FIGS. 5-8, the toolbar 30 needs to be lifted, and, if needed, the tongue 12 needs to be telescoped to increase the length between the hitch 18 and a second end 15 of the tongue 12. Such extension, as has been disclosed, is required when the length of the toolbar 30 is such that there would be interference between the toolbar 30 and the tow vehicle without said extension of tongue length. Therefore, the tongue 12 may be first extended, as has previously been shown and disclosed, such as in FIGS. 33-40. Next, or prior to the extension of the tongue 12, the toolbar 30 can be lifted.

To lift said toolbar 30, the invention includes a toolbar lifting assembly 40 operatively positioned and attached to the frame 20 at the second end 15 of the tongue 12. The toolbar lifting assembly 40 includes, among other components, one or more lifting actuators connected via a linkage to the toolbar 30. For example, as is shown in the figures, the toolbar lifting assembly 40 includes a first actuator 41 and a second actuator 42. Each of the actuators 41, 42 include a cylinder or housing 44 and a rod 46 for extending and retracting via or relative to the housing 44. In the figures of the disclosure, extension of the actuators 41, 42 will lift the toolbar 30 and components attached thereto relative to the frame 20. While first and second actuators 41, 42 are shown to be included as part of the lifting assembly 40, it should be appreciated that the invention need not require two specific actuators. For example, a single actuator capable of lifting the toolbar 30 and components attached thereto is contemplated to be used as part of the lifting assembly 40. Furthermore, a number greater than two actuators can also be utilized to lift the toolbar 30 and attachment components relative to the frame 20. The size and number of actuators can be selected based upon a number of components. For example, the length of the toolbar 30, the number of row units 36 attached thereto, the size and weight of the bulk hoppers 29, the type of seed being planted via the row units 36, as well as additional factors may dictate the size and number of actuators as part of the lifting assembly 40. Therefore, the present invention is noted to include generally any number of actuators for being capable of lifting said toolbar 30 and/or attachment components.

Referring to FIGS. 25-28, the lifting assembly 40 is shown in greater detail. For example, the actuators 41, 42 are shown. To combine the power of the first and second actuators 41, 42, a trunnion 54 can be operably connected to the actuators 41, 42, such as at the housing 44 of the actuators 41, 42. Therefore, the trunnion 54 will cause the cylinders to act in synchronicity or unison to combining the power of the separate actuators to work as if there was one larger actuator. The trunnion 54 can be any mechanism capable of operably attaching to a portion of the actuators, and not necessarily to the actuators themselves, but to components connected thereto, to combine the power of the actuators to be able to lift the toolbar 30 and attachment components thereto.

Figure 23:
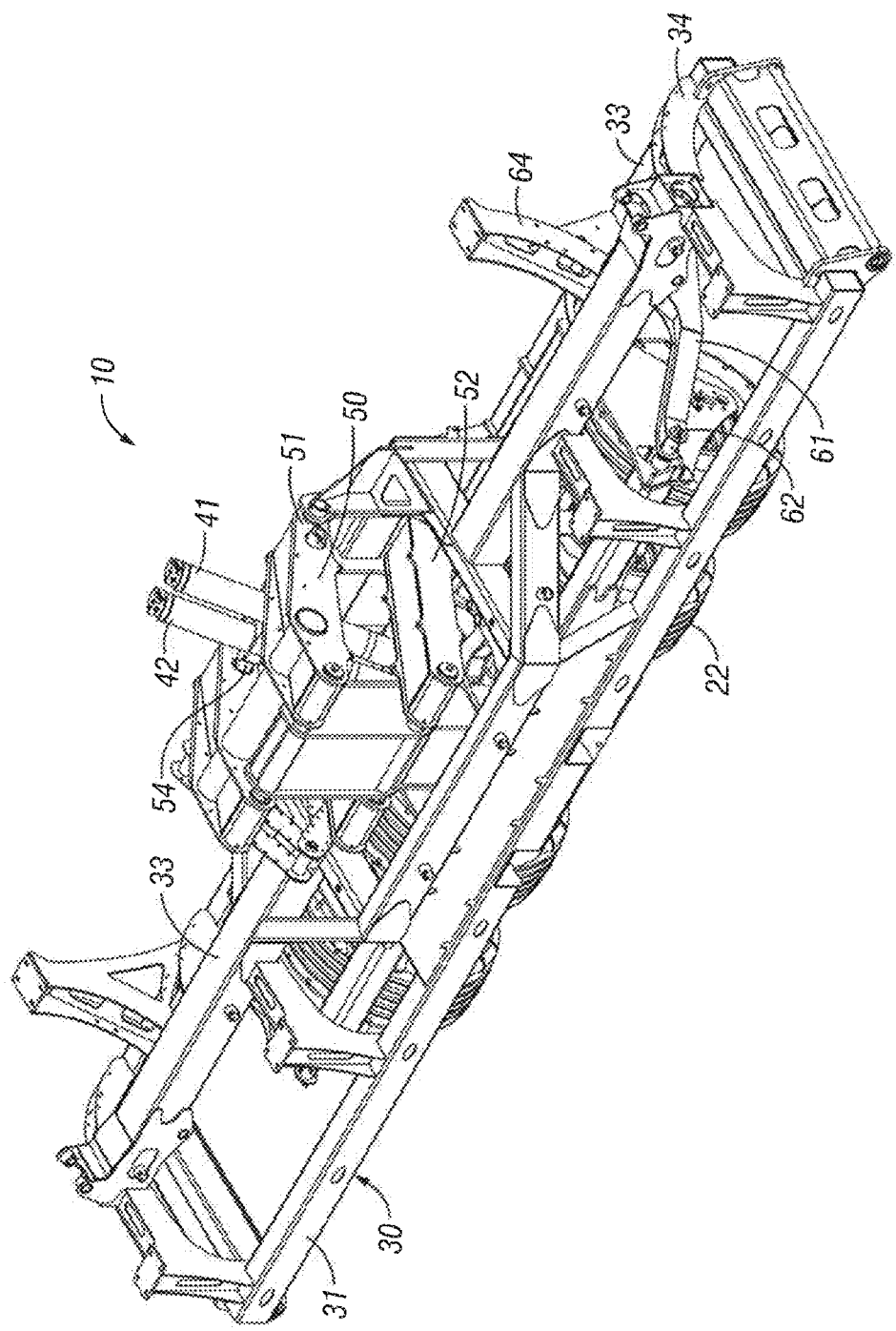
FIG. 23 is a perspective view of a section of the toolbar and frame of an agricultural planter according to aspects of the invention.
Figure 24:
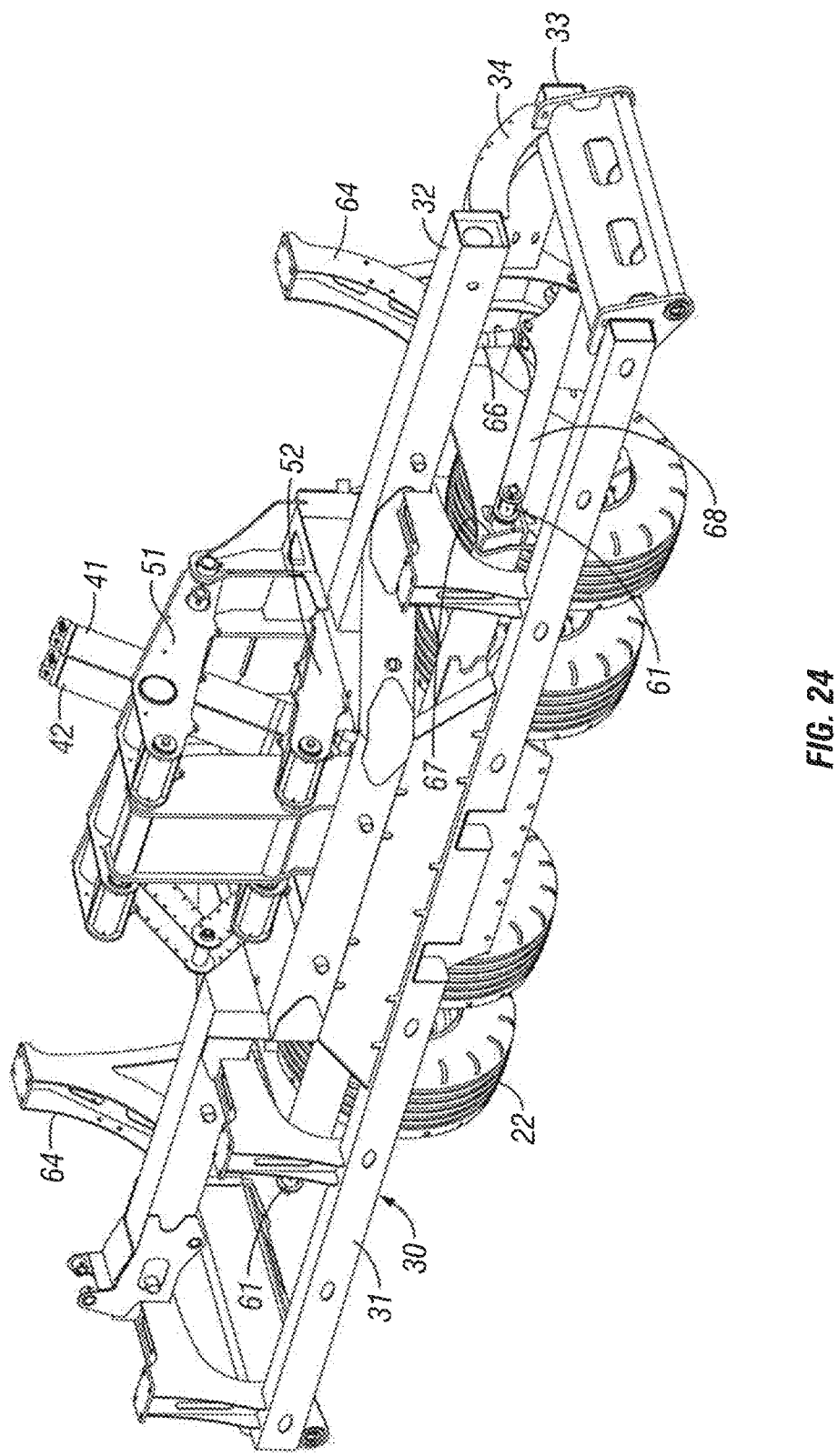
FIG. 24 is a perspective view of a section of the toolbar and frame of an agricultural planter according to aspects of the invention.
Figure 25:
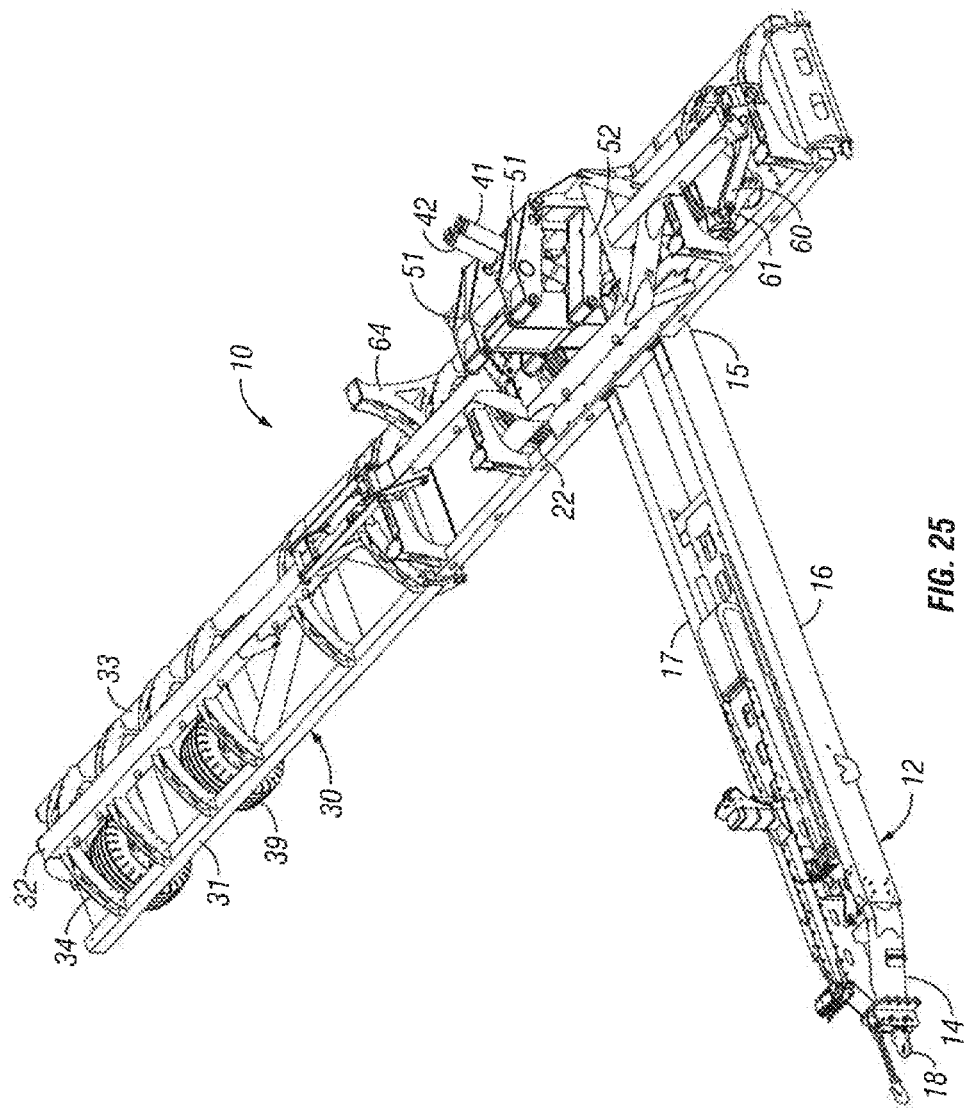
FIG. 25 is a perspective view of a section of the toolbar, frame, and tongue of an agricultural planter in a field use configuration according to aspects of the invention.
Figure 26:
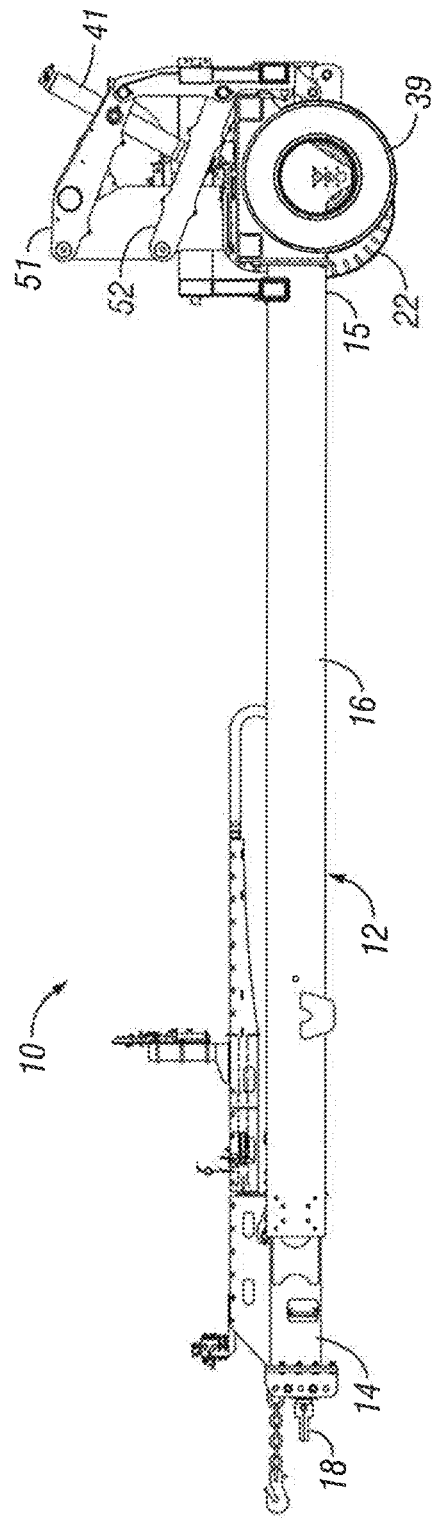
FIG. 26 is a side elevation view of the planter of FIG. 25.

Furthermore, as is shown in the figures, the lifting assembly 40 can include a linkage assembly 50, comprising first and second upper linkages 51 as well as first and second lower linkages 52. The upper linkages 51, as is shown in FIG. 25, are positioned on opposite sides of the first and second actuators 41 and rotatably connected to a center post 43. The upper linkages 51 can be connected at a first end to the frame 20, such as the rotating pillar of the frame 20, and at a second end to the toolbar 30. Likewise, the lower linkages 52 can be attached at a first or front end to the frame 20, such as at a rotating portion thereof, and at a second end to a portion of the toolbar 30 as well. Furthermore, as is shown in FIGS. 23 and 24, portions of the upper linkages 51 may be connected to the trunnion 54, which is operably attached to the actuators 41, 42. This will aid in having the trunnion combine the power of the separate actuators to lift the toolbar 30 and attach components thereto. Therefore, FIG. 26 is a side elevation view of the planter 10 showing the toolbar 30 in the lowered field use configuration. However, transitioning to FIG. 20A, the actuators have been extended to extend the rod 46 relative to the housing 44 of the cylinders 41, 42. The actuators 41, 42 are connected to the frame 20 to allow the actuators to rotate as they extend. The path of the rotation is also aided by the upper and lower linkage arms 51, 52 on opposite sides of the actuators 41, 42. Thus, the length and shape of the linkage arms 51, 52 can provide a desired path for the lifting and rotation of the toolbar 30 via the extension of the actuator rods to best lift the toolbar 30 and attached components. As is shown in FIG. 20A, the toolbar 30 and attached components have been lifted such that the wheel 39 is substantially above the tongue 12 such that rotation of the toolbar 30 will have enough clearance between the components of the toolbar 30 and the components of the tongue 12 to transition the toolbar 30 from the configuration shown in FIG. 1 to the configuration shown in FIG. 5. In such configuration shown in FIG. 5, the toolbar 30 is generally aligned with the longitudinal axis of the tongue 12 such that the planter 10 is in the transport configuration to allow for the planter 10 to be transported from one location to another while taking up a minimal width and height.

Figure 28:
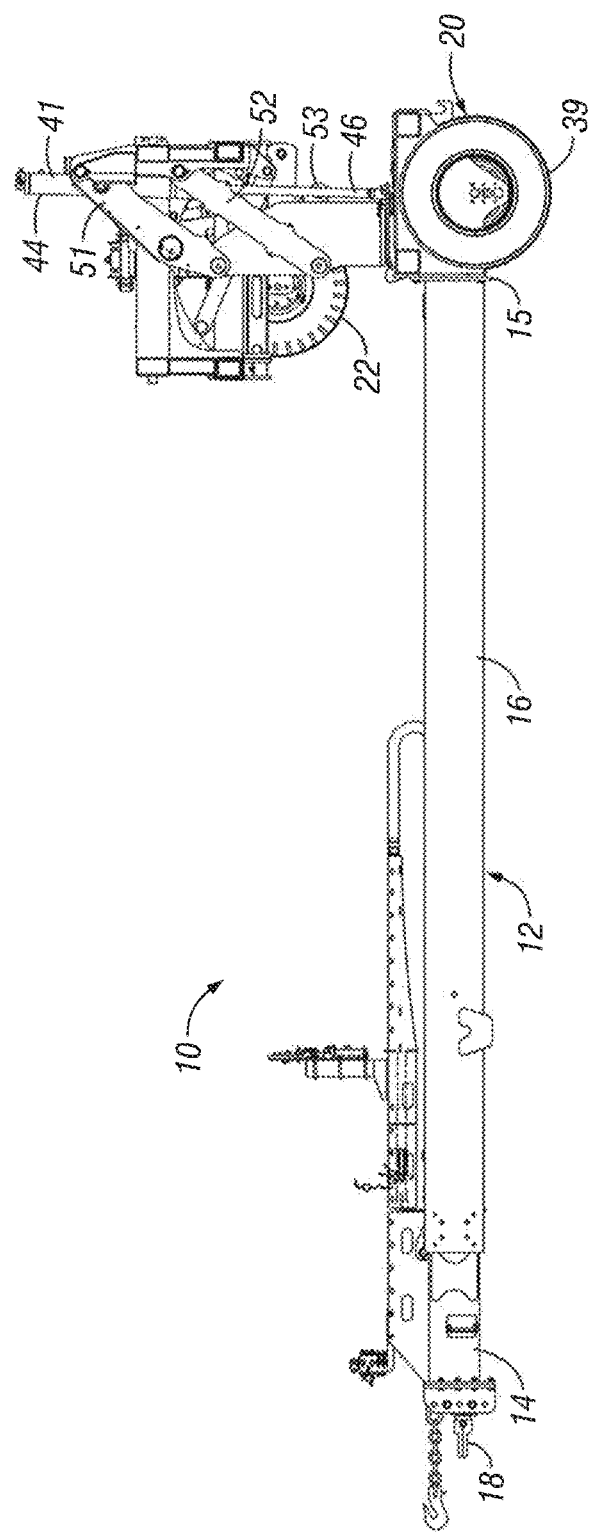
FIG. 28 is a perspective view of a section of the toolbar, frame, and tongue of an agricultural planter in a lifted configuration according to aspects of the invention.

Therefore, once the toolbar 30 and attached components have been lifted as is shown in FIG. 28, a rotating assembly (not shown) can be activated to rotate the toolbar 30 approximately 90 degrees, such as in the direction shown by the arrow 48 to transition the toolbar 30 from the position transverse to the tongue 12 to a position generally aligned or in parallel with the tongue 12. To transition the planter 10 from the transport configuration back to the field use configuration, the entire process is reversed. Therefore, the rotation mechanism is activated to rotate the toolbar 30 and attachment components 90 degrees in the opposite direction of the arrow 48 to configure the toolbar's longitudinal axis generally transverse or perpendicular to the longitudinal axis of the tongue 12. As such, a configuration, the actuators 41, 42 can then be retracted and the toolbar 30 and attachment components can travel the path dictated by the upper and lower linkage arms 51, 52 of the linkage assembly 50 to lower the toolbar 30 to the field configuration, such as that shown in FIG. 3. As such a configuration, the planter 10 is in a position to begin planting seed from the central hoppers 29.

While the invention has been shown to be a lifted rotate mechanism with various actuators and linkages, it should be appreciated that, due to the length of the toolbar 30, and thus the weight associated there with, additional safety, down pressure, and stress reduction mechanisms can be included to prolong the life of the planter. For example, when the toolbar 30 and components attached thereto have been slightly lifted, such as in a turning configuration, the any turning of the planter may cause the end sections of the toolbar to want to oscillate or otherwise walk. While the rotating cylinder of the rotating mechanism can aid in mitigating such oscillation or rotation of the ends of the toolbar 30, this cannot prevent all of said rotation. Furthermore, the continued oscillation can create stress on the components of the rotating mechanisms such that the failure rate may be higher than what is desired. Therefore, the invention includes a novel and unique anti-rotation link system to aid in preventing or otherwise mitigating the oscillation, rotation, or walking of the toolbar 30, such as when the toolbar 30 is in a turning configuration where it is raised at least partially off the ground. Furthermore, it should be appreciated that such an anti-rotation link system of the invention can prevent any oscillation or walking while the toolbar and components thereof are also engaged in the ground, such as to provide a more straight line planting of the row units in the ground.

FIGS. 20-24 show details of the anti-rotation link system according to aspects of the invention. The location of the anti-rotation link system is shown to be spaced outwardly from the central frame 20 and lifting assembly 40. However, the exact placement of the anti-rotation link system relative to the toolbar may be varied according to the length of the toolbar, as well as other factors so as to prevent or mitigate the oscillation of the ends or wings of the toolbar 30. Therefore, as shown in FIGS. 20-24, the anti-rotation link systems includes an anti-rotation link 60, which extends from a toolbar link 64 to and towards a guide or catch of the central frame 20. The anti-rotation link 60 includes a first free end 61, which may be a roller capable of rotating at the end of the link 60. Thus, the roller 61 allows for the guided movement of the link 60 relative to the guide 67, as would be understood. At an opposite end of the link 60 is a link connection point 63 connecting the anti-rotation link 60 to a toolbar link 64. The toolbar link 64 is a mechanism connecting the anti-rotation link 60 to the toolbar 30, such as at the rear bar 33 and/or the upper bar 32. Thus, the toolbar link can be attached to the toolbar 30 in any known manner, such as by bolting, welding, or the like. Further components of the anti-rotation link system include an actuator 66 having one end 62 connected to the anti-rotation link 60 and an opposite end connected to the toolbar link 64. The cylinder or actuator, which can be a hydraulic, pneumatic, electric, linear actuator, or some combination thereof, can aid in providing a downforce or down pressure to keep the ends of the toolbar from rotating, swiveling, or walking. Therefore, the actuator 66 can be set to try to aid in maintaining the travel of the toolbar section 30.

Figure 20:
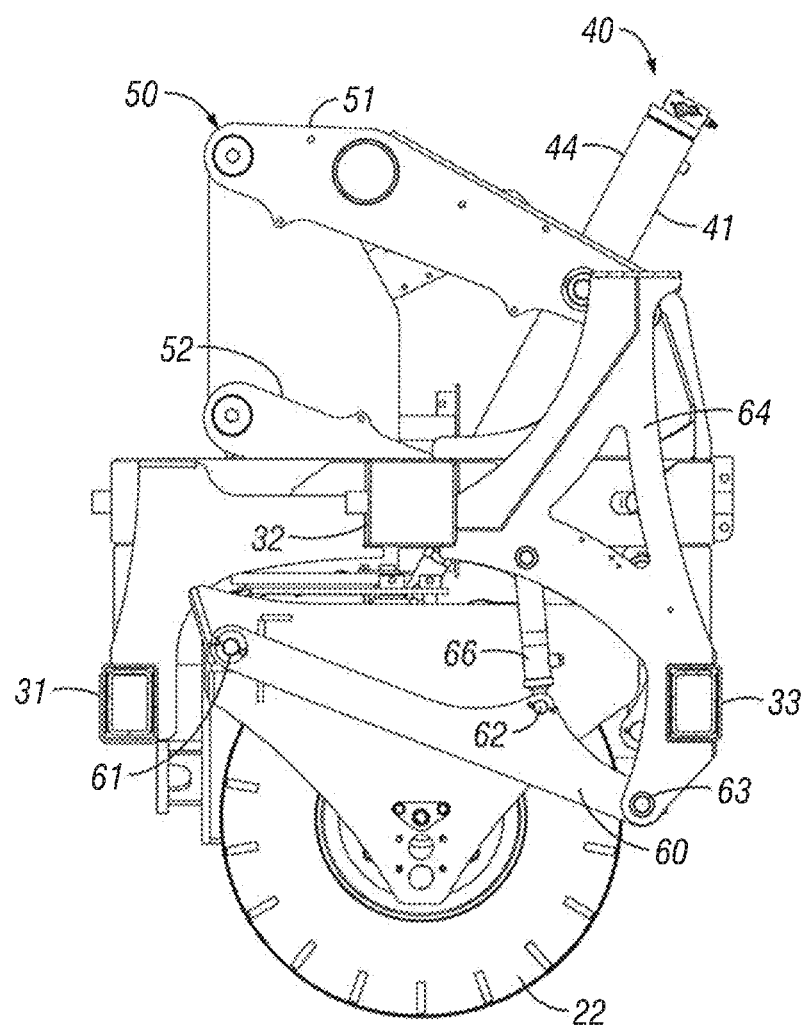
FIG. 20 is an enlarged side view of linkages of an agricultural planter in a field use configuration according to aspects of the invention.
Figure 21:
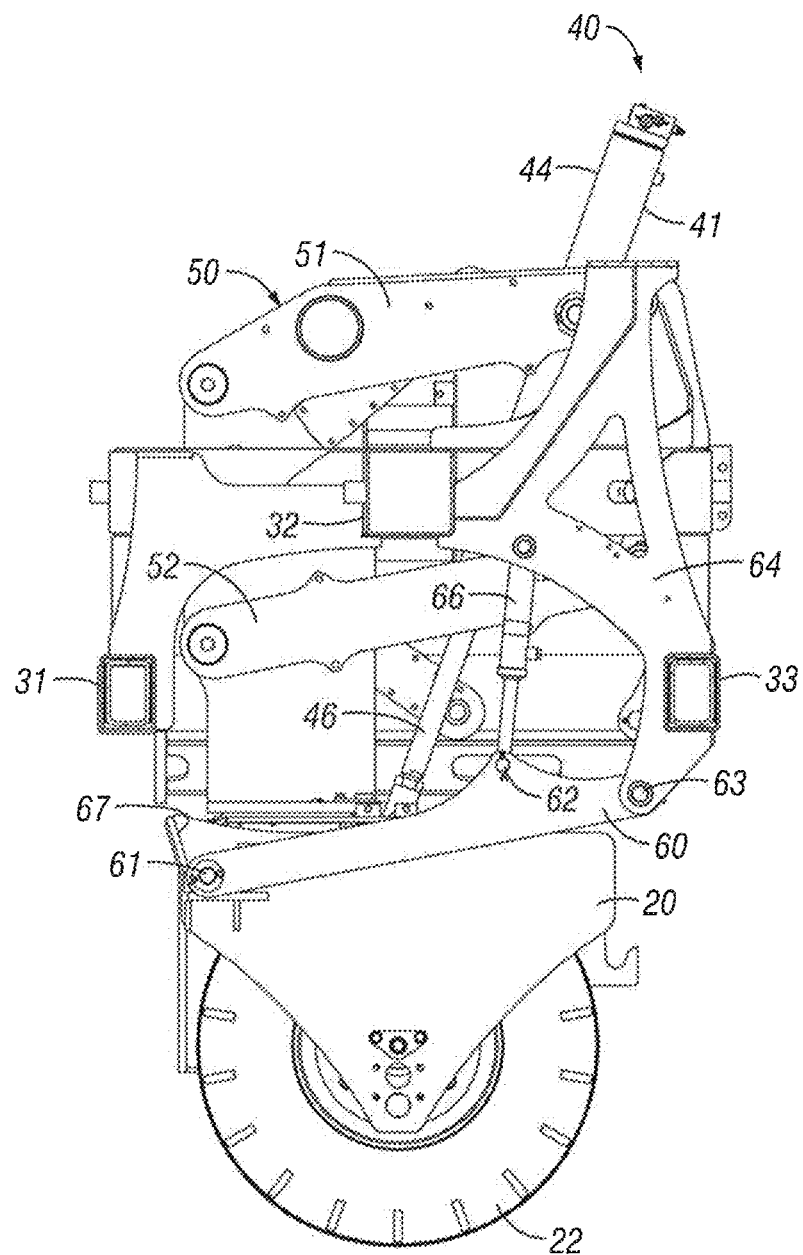
FIG. 21 is an enlarged side view of linkages of an agricultural planter in a turning configuration according to aspects of the invention.
Figure 22:
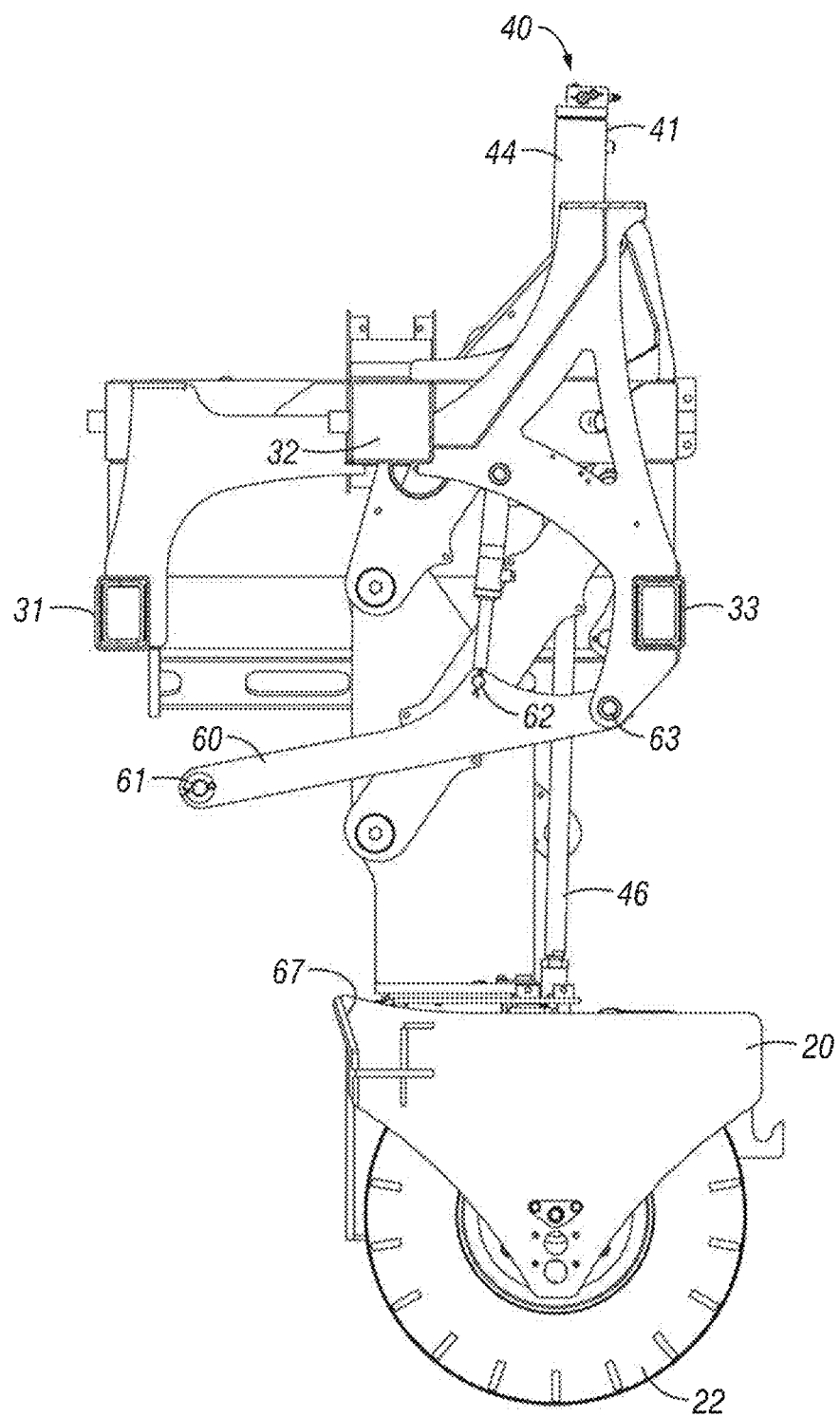
FIG. 22 is an enlarged side view of linkages of an agricultural planter in a transport configuration according to aspects of the invention.

Furthermore, the length and configuration of the toolbar link 64 connected to the anti-rotation link 60 will allow for the toolbar link to have the same path of travel to that of the four bar linkage system 50, which is used to lift the toolbar 30 and components attached thereto during transition to and from the field use configuration and transport configurations. Having the same travel, such as by having the same geometry of the linkage systems, provides numerous advantages. This allows for the toolbar to be lifted, such as shown in FIGS. 20-22. The Figures show the extension of the actuators 41, 42 of the lifting system 40. The upper and lower linkages 51, 52 will cause the travel, which is an arched travel of the toolbar as it is lifted via the actuators. This same arched travel can be accomplished with the anti-rotation link 60 due to the geometry of the link 60 as well as the connection to and geometry of the toolbar link 64. Having the systems travel the same path will allow for the toolbar to be lifted in unison such that it will reduce the rotation, swiveling, oscillation, or the like of the toolbar 30 relative to the tongue 12. Furthermore, the actuation of the cylinder 66 of the anti-rotation system will further control the lifting of the toolbar 30, such as further preventing any oscillation of the toolbar 30.

The free end 61 of the anti-rotation link 60, as is shown in FIGS. 20-22, is allowed to travel from within the guide 67 to outside the guide. Furthermore, the arch of travel can be shown best from FIGS. 20-22, wherein the free end 61 is shown to be above and forward of the guide 67 when moving from the configuration shown in FIG. 20 to that shown in FIG. 22. Therefore, that arch is the same as the toolbar, which provides for the anti-rotation link to not get caught up in aspects of the planter 10, which could damage the planter during lifting thereof.

Therefore, the inclusion of the anti-rotation link provides numerous advantages both during field use configuration and in transitioning to the transport configuration. For example, in field use configuration, such as when turning said planter 10, the anti-rotation link will reduce the stress on the rotating cylinder of the rotating mechanism, such as by reducing, preventing, or otherwise mitigating oscillation of the toolbar 30. Having the link reside in a guide 67 and with the actuator 66, this will aid in maintaining the transfers alignment of the toolbar relative to the tongue. Still further, having the geometries of the lifting linkage system 50 and the linkage system of the anti-rotation link 60 be similar or the same will allow for the path of travel of the toolbar as well as the path of travel of the anti-rotation link system to be the same during the lifting of the toolbar and components attached thereto. This will make the transitioning easier.

Still additional components of the planter 10 are shown throughout the figures. As the weight of the toolbar is to be minimalized so that the lifting and rotating of the toolbar can be accomplished using the least amount of force, the positioning of fertilizer or other tanks can be moved from their standard location at or near the central frame or at or near the central hoppers 29 to a location as shown in the figures, connected to the first and second component 16, 17 of the telescoping tongue 12. This is shown throughout the figures, and in particular in FIGS. 1-8, 29-32, and 43-50. Therefore, as is shown in the figures, the fertilizer or other chemical tanks 28 can be positioned alongside of the tongue 12 and connected operatively thereto. To connect the tanks to the tongue, the invention includes the use of unique and novel tank supports 24, 26. The tank supports 24, 26, are shown to be on opposite sides of the tongue 12 and connected to only one of the first or second tongue portions 16, 17. However, it should be appreciated, that when a single tongue is utilized, the one or more tank supports 24, 26 can be attached to the single tongue member, or else the only one of the two tank supports be attached to the tongue member.

Figure 5:
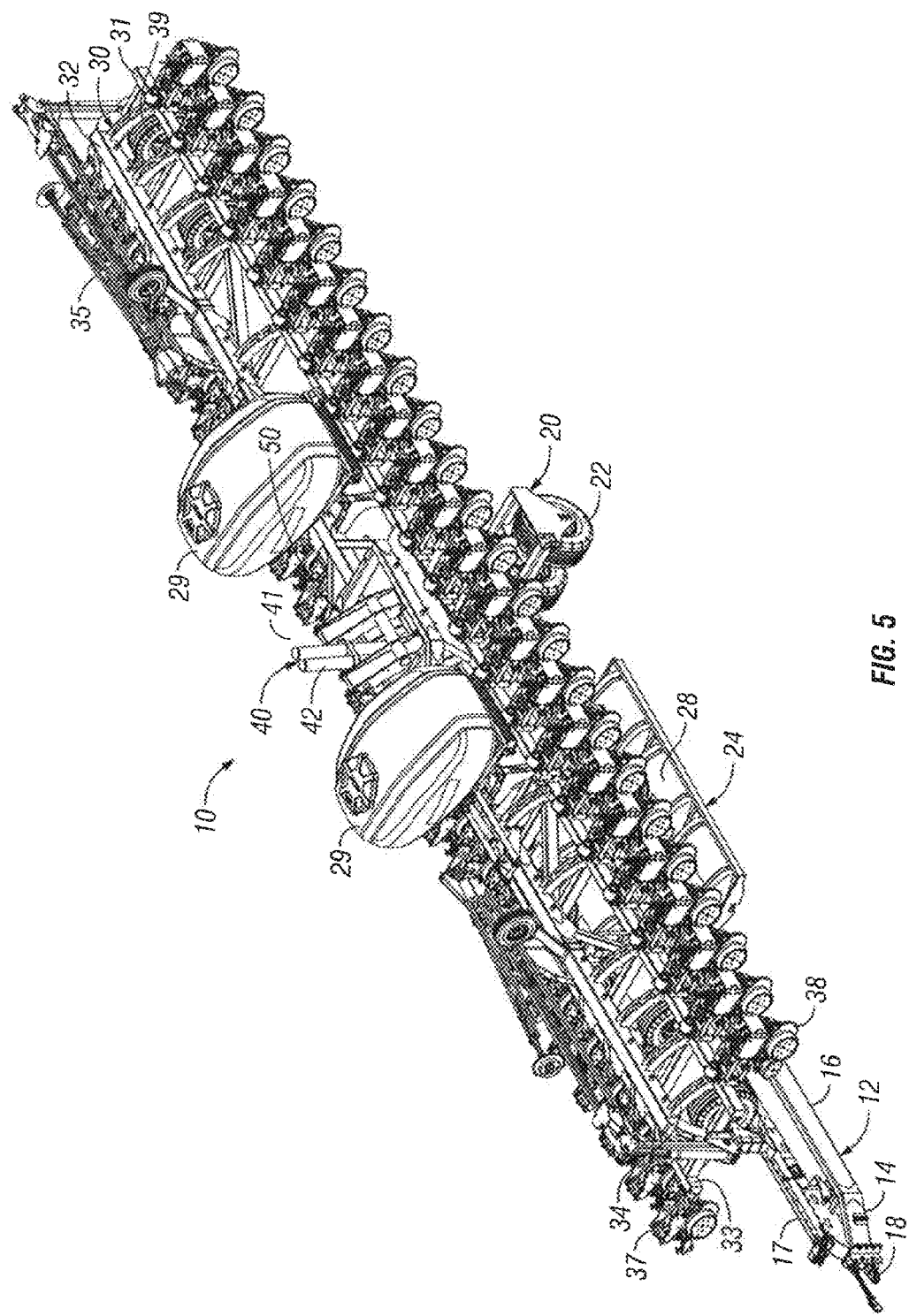
FIG. 5 is a perspective view of an agricultural planter implement in a transport configuration according to aspects of the invention.
Figure 6:
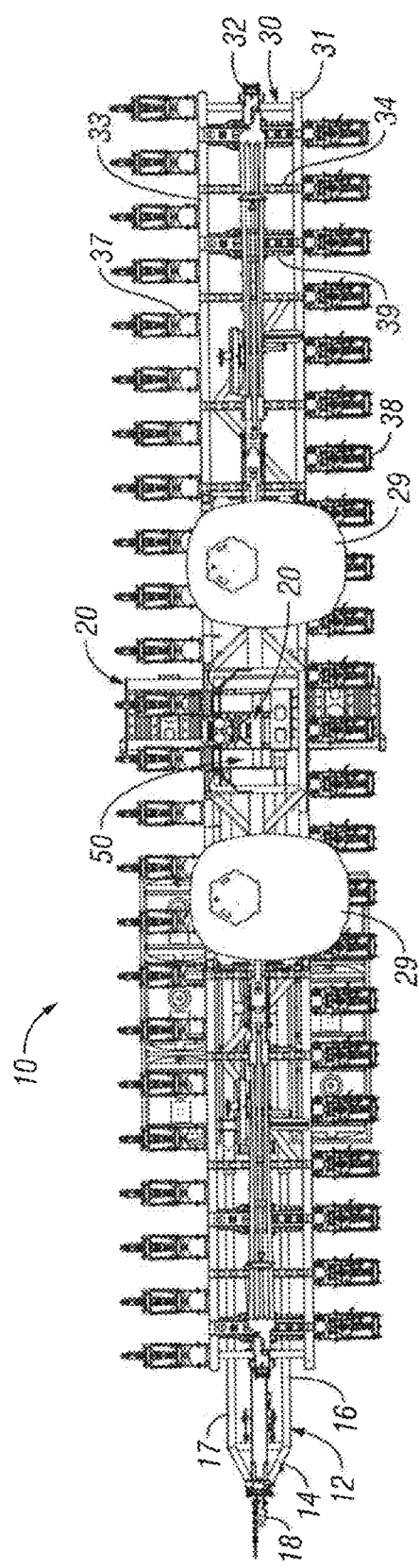
FIG. 6 is a top plan view of the planter of FIG. 5.
Figure 7:
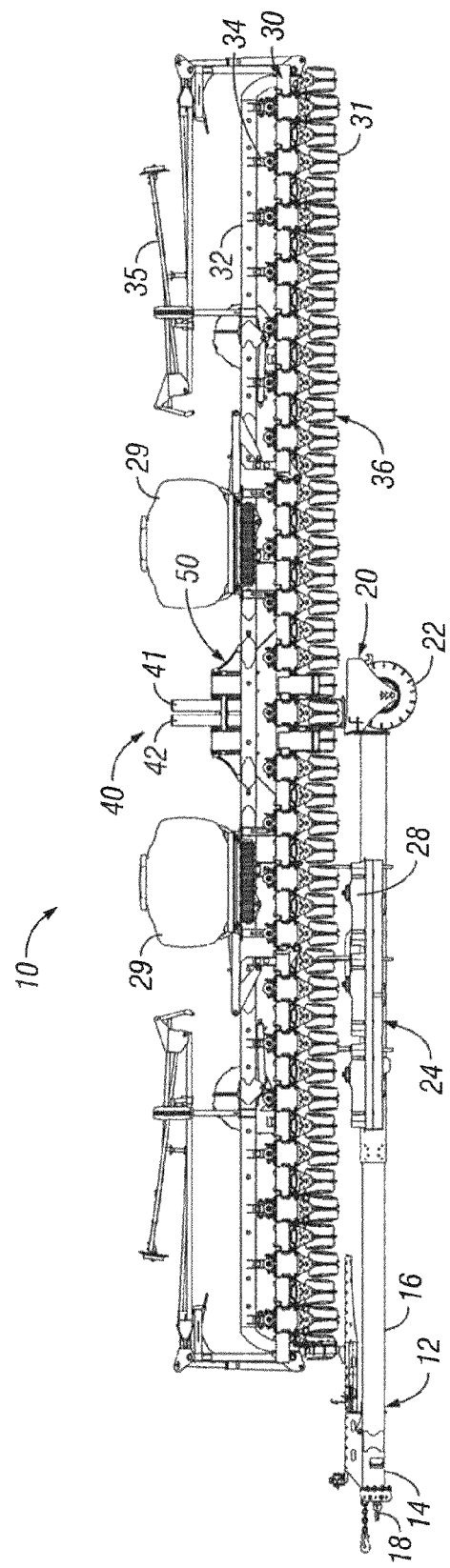
FIG. 7 is a side elevation view of the planter of FIG. 5.
Figure 8:
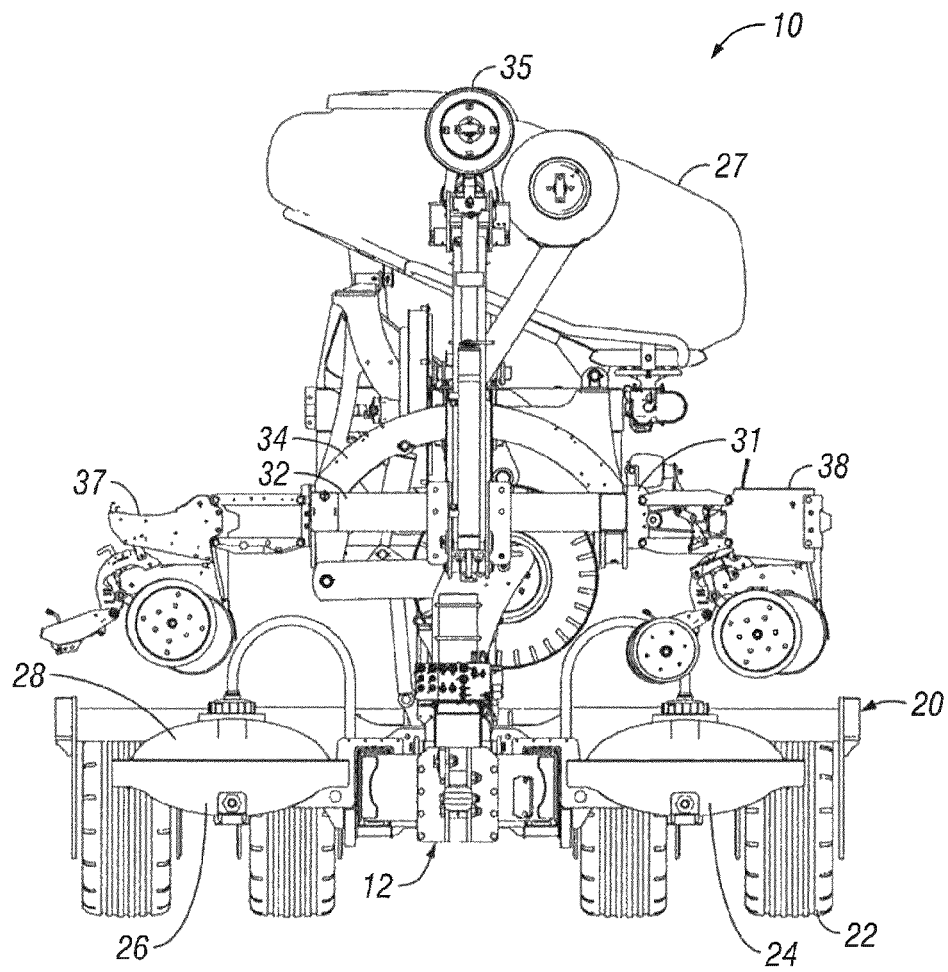
FIG. 8 is a front elevation view of the planter of FIG. 5.
Figure 29:
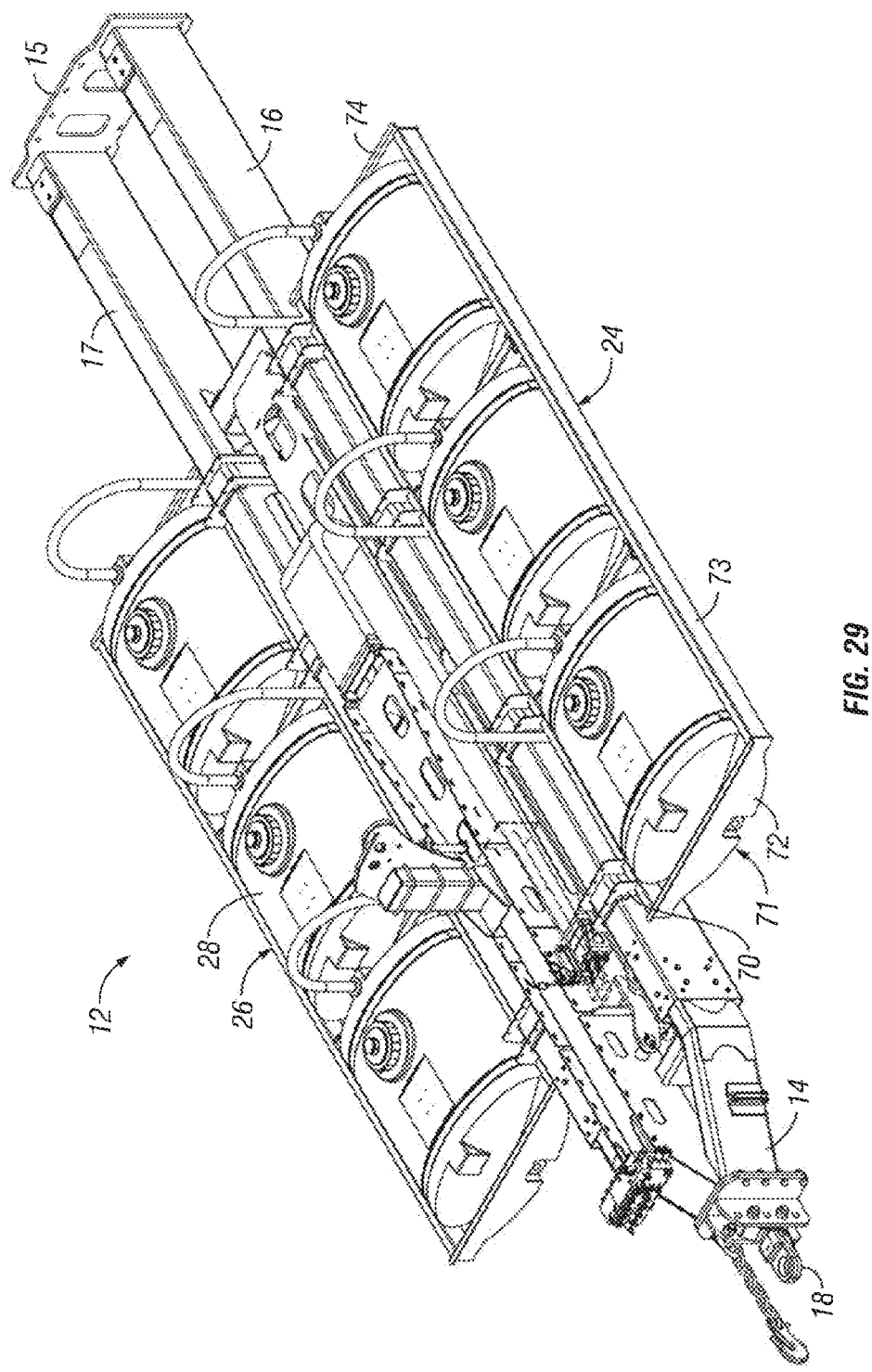
FIG. 29 is a perspective view of fertilizer tanks and supports attached to a tongue of an agricultural planter implement according to aspects of the invention.
Figure 30:
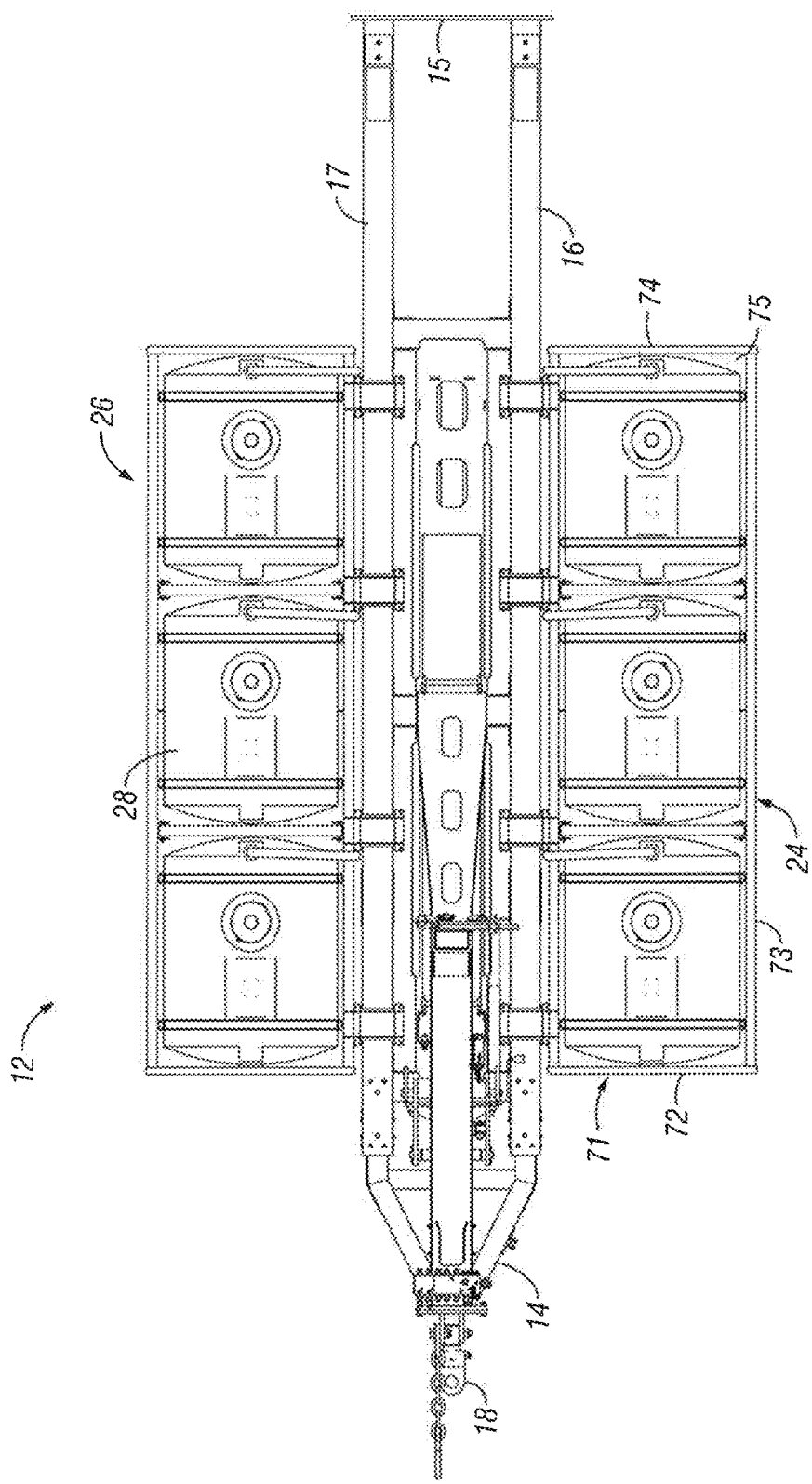
FIG. 30 is a top plan view of the planter of FIG. 29.
Figure 31:
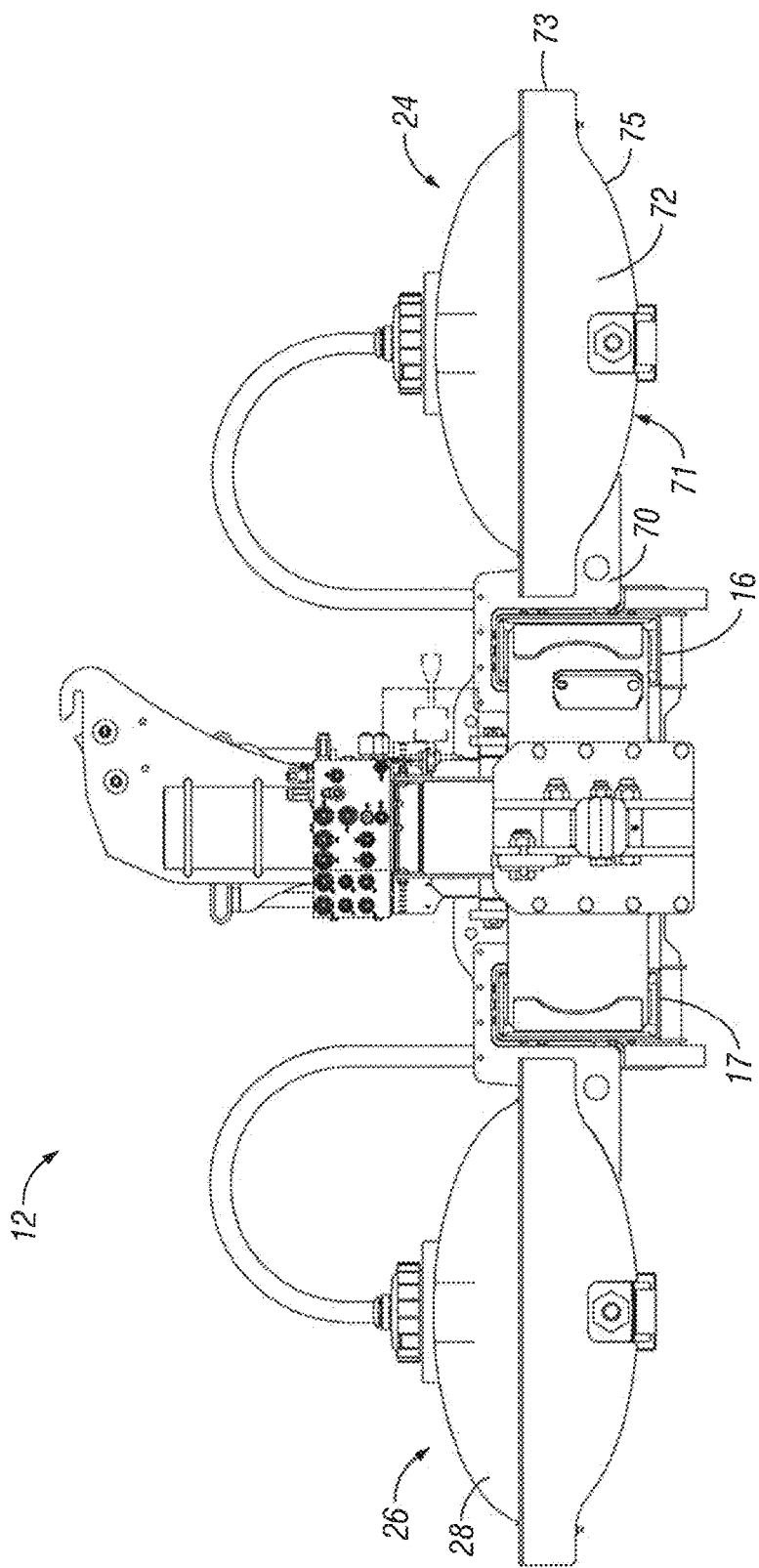
FIG. 31 is a front elevation view of the planter of FIG. 29.
Figure 32:
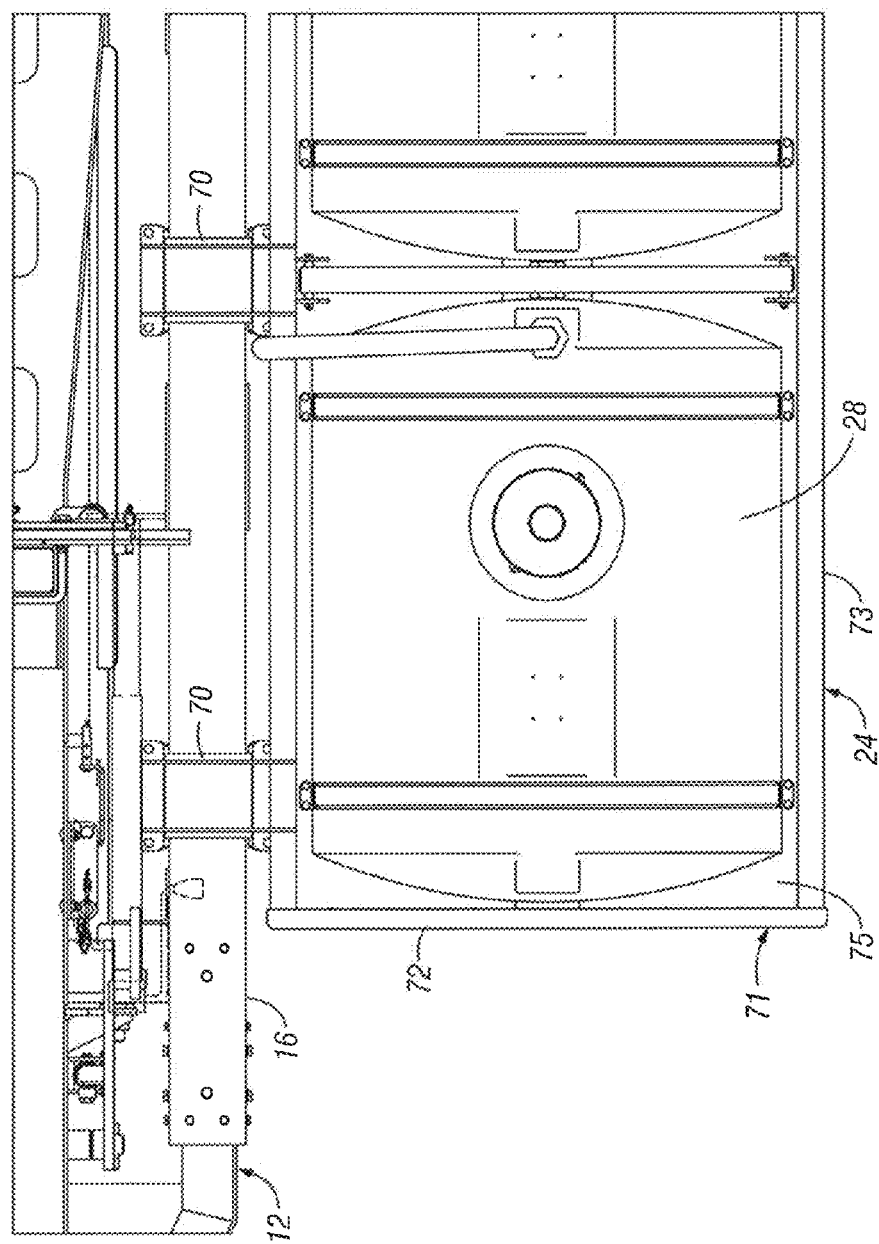
FIG. 32 is an enlarged top view of a portion of the planter of FIG. 29.
Figure 43:
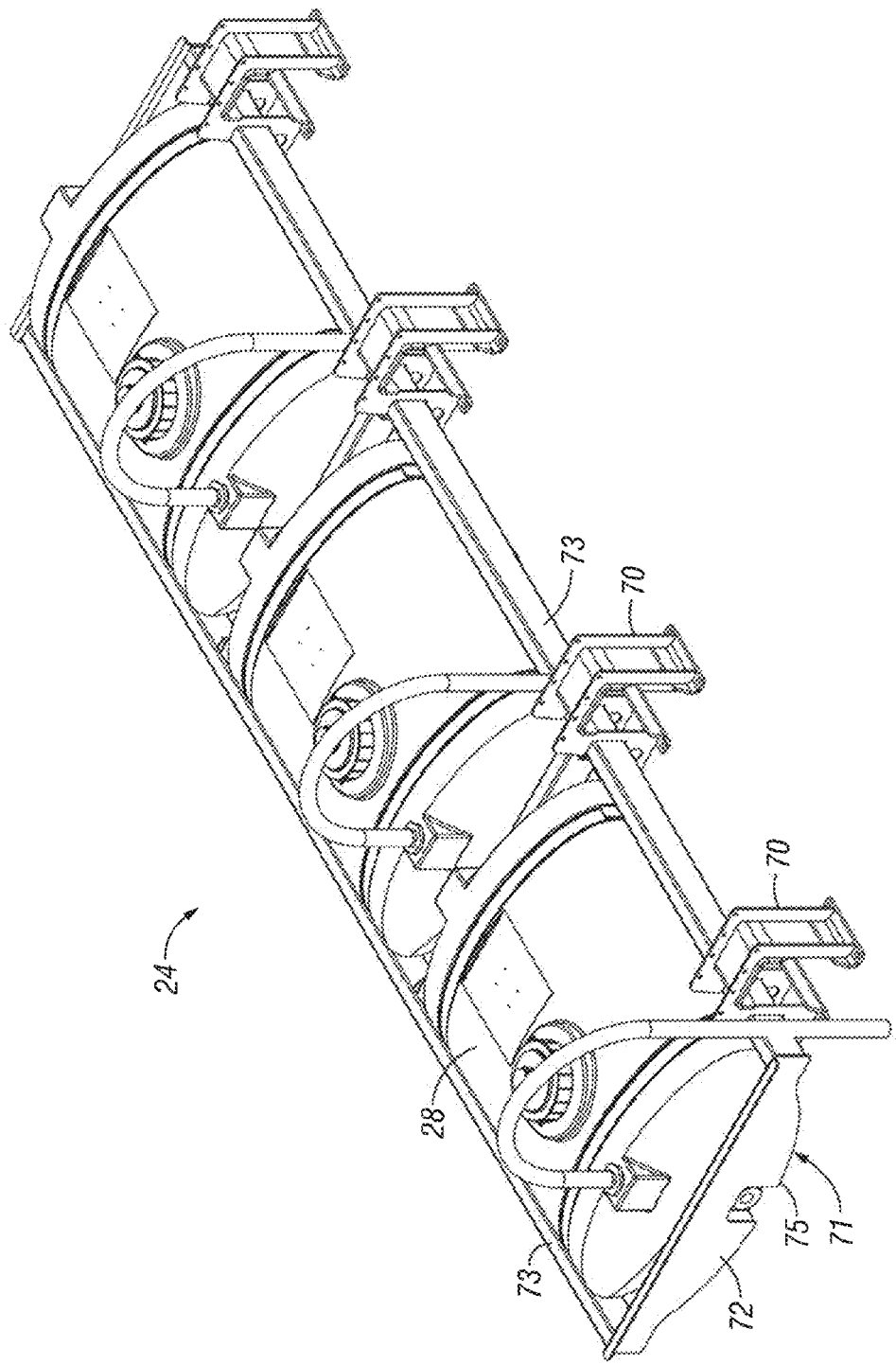
FIG. 43 is a perspective view of a tank holder with tanks for use with an agricultural planter according to aspects of the invention.
Figure 44:
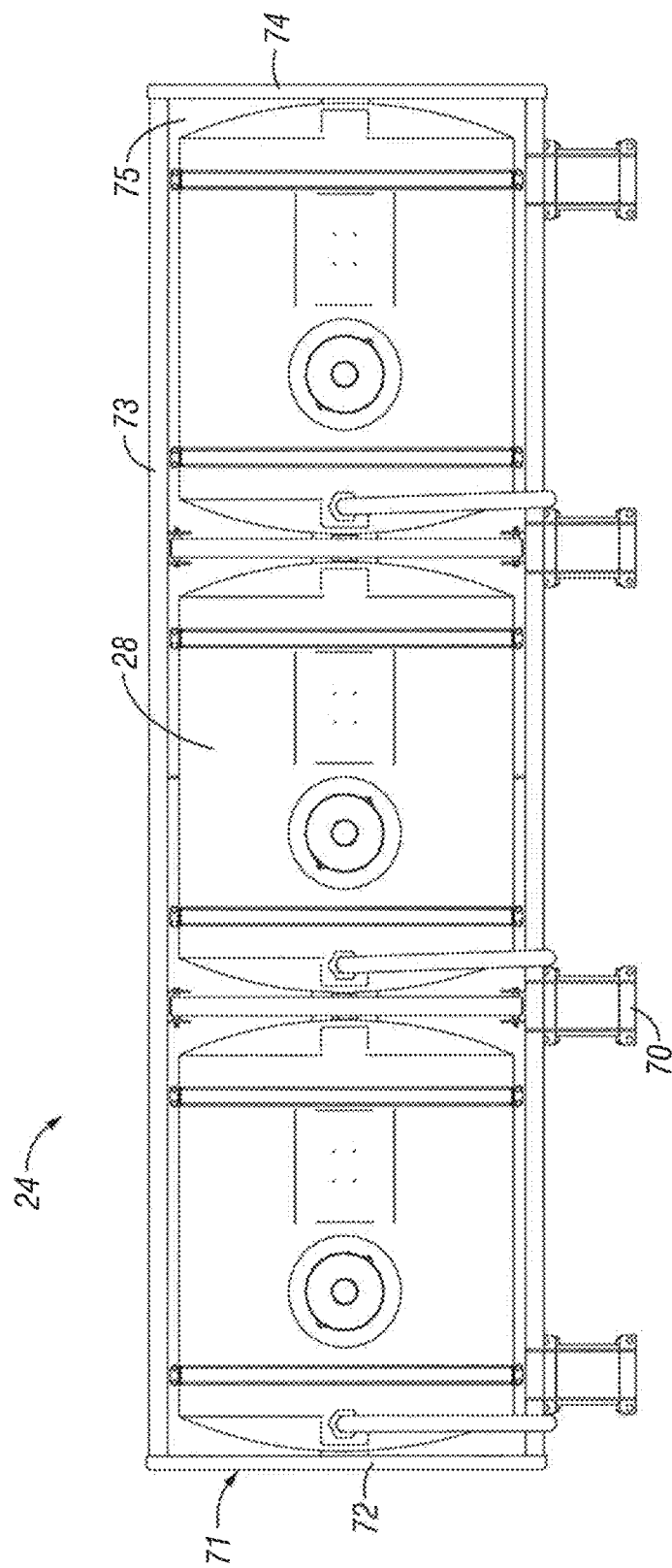
FIG. 44 is a top plan view of the tank holder of FIG. 43.
Figure 45:
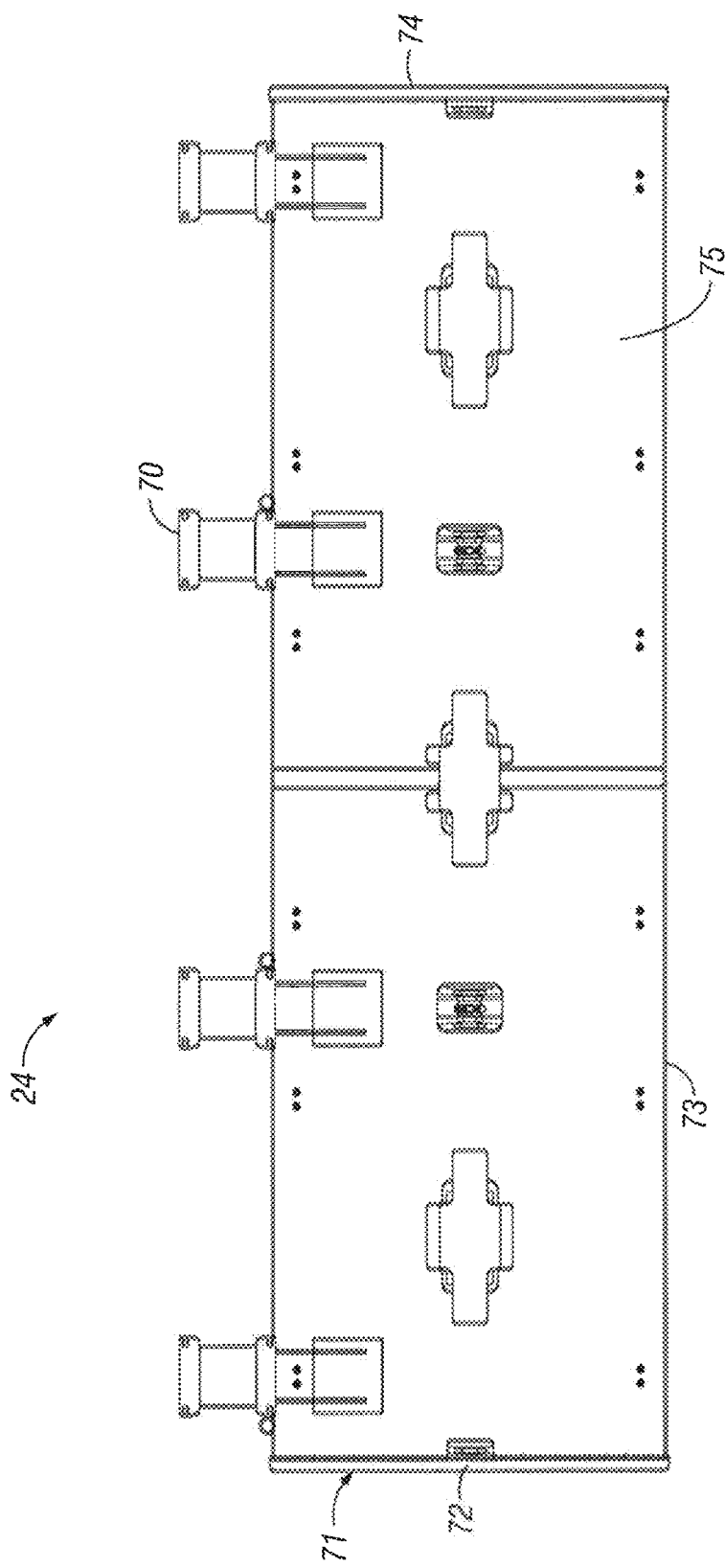
FIG. 45 is a bottom plan view of the tank holder of FIG. 43.
Figure 46:
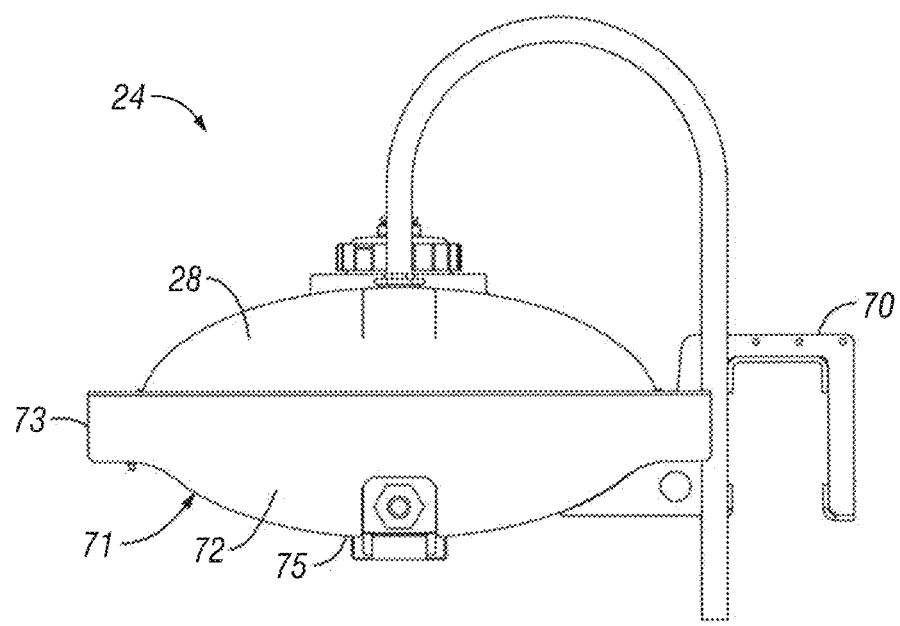
FIG. 46 is a front elevation view of the tank holder of FIG. 43.
Figure 47:
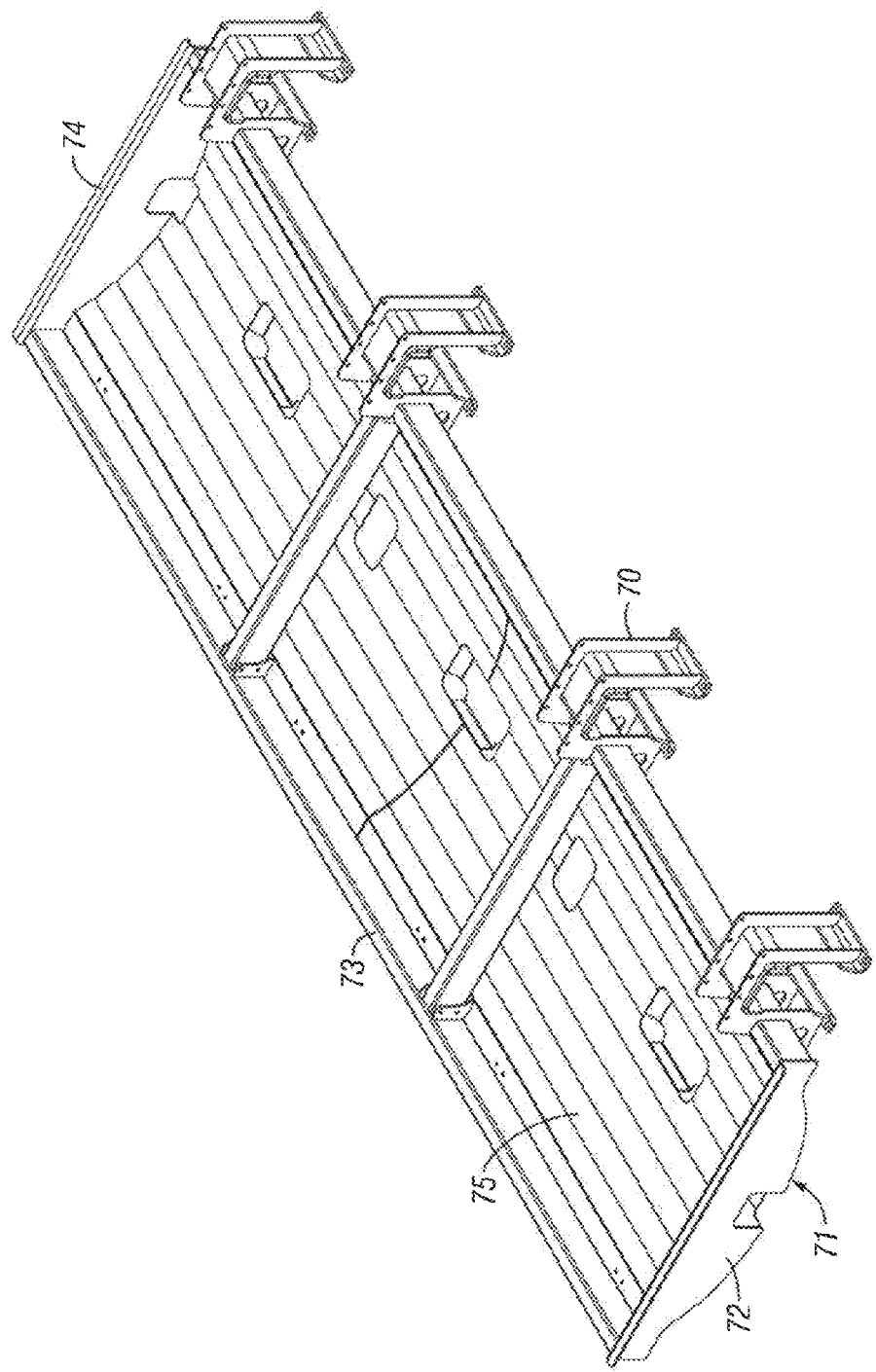
FIG. 47 is a perspective view of a tank holder without tanks for use with an agricultural planter according to aspects of the invention.
Figure 48:
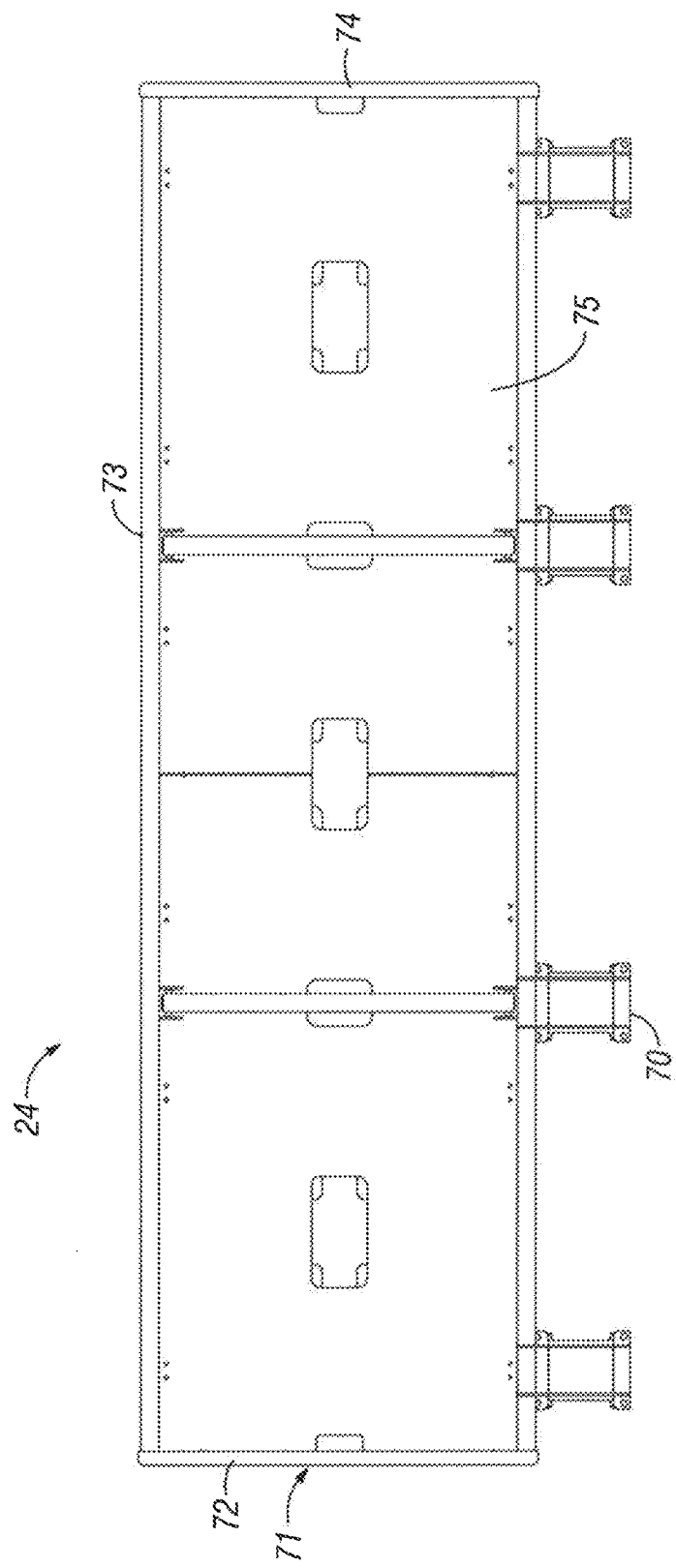
FIG. 48 is a top plan view of the tank holder of FIG. 47.
Figure 49:
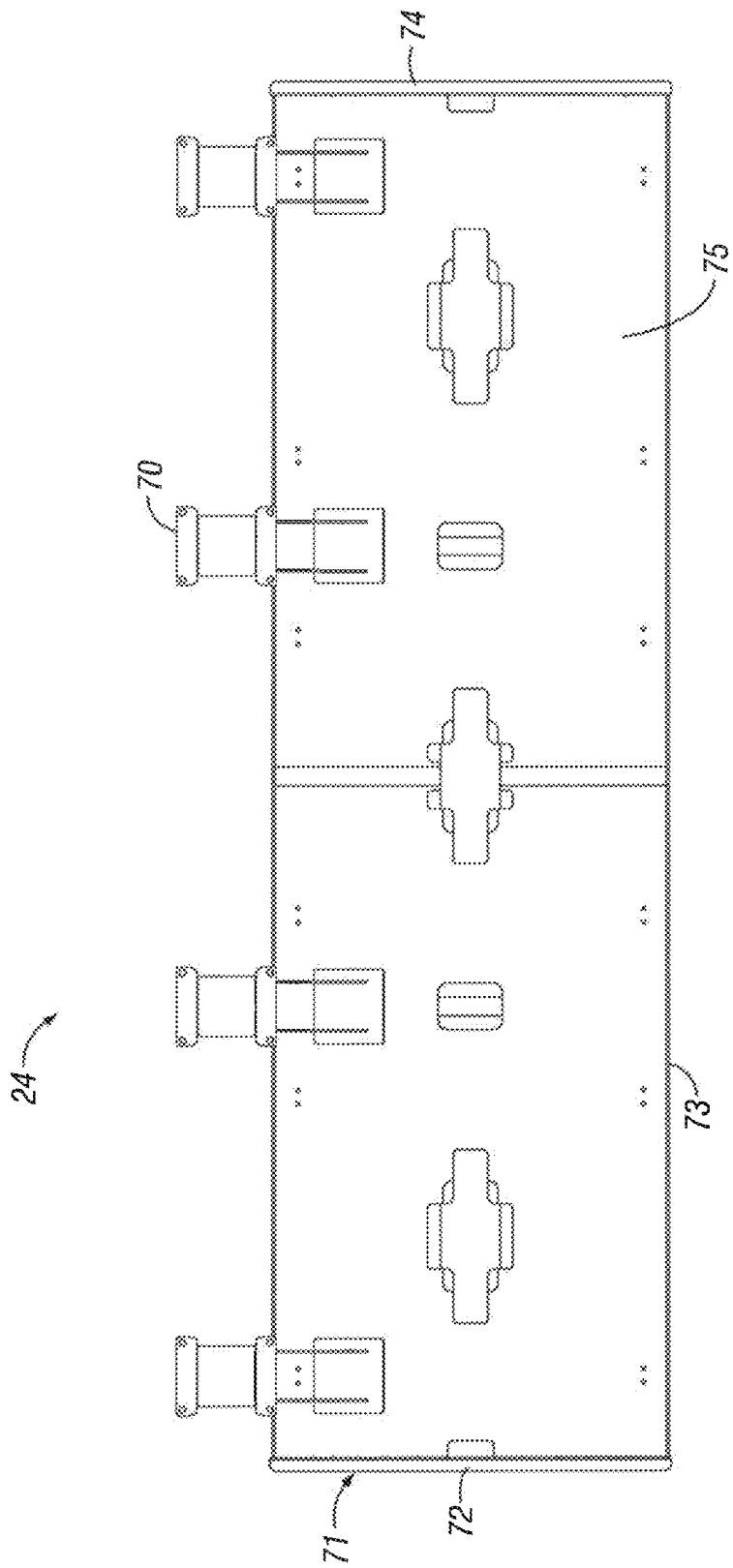
FIG. 49 is a bottom plan view of the tank holder of FIG. 47.
Figure 50:
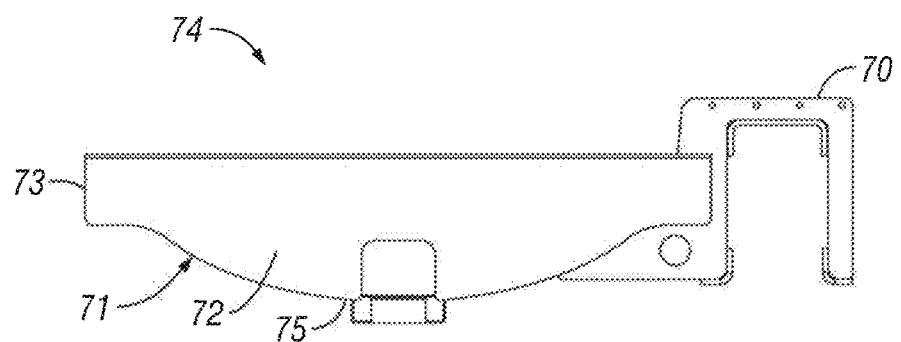
FIG. 50 is a front elevation view of the tank holder of FIG. 47.

The tongue support members, shown best in FIGS. 47-50 without the inclusion of the tanks, include a connecting member 70, which may be similar to a saddle type connection. As is shown, the saddle connection 70 is a horseshoe shaped member which can be positioned over the telescoping portion 16 or 17. The connection member 70 can then be connected, such as via nuts and bolts, or other connection members to secure the support member 24 to the tongue portion. Connecting to and extending generally from the plurality of connection member 70 is the support body 71. The support body 71 includes generally a front portion 72, side portion 73, and a rear portion 74. Furthermore, in connecting to all of the front sides and rear portions is a bottom or basin portion 75. The basin portion 75 allows for the tanks to be positioned at a lower position within the support body 71. Having the body or basin portion 75 lower will allow the tanks to reside lower such that the tops of the tanks will be at or near the upper portions of the tongue. This will allow for the amount of clearance required by the lifting of the toolbar 30 and the components attached thereto to remain unchanged, such as if the tanks were not included and/or attached to the tongue 12 itself. While the body 71 of the supports 24 includes a particular shape as shown in the figures, it is to be appreciated that said shape is included only to match one of many types of fertilizer tanks 28 as is also shown in the figures. For example, as is shown in FIGS. 29, 43, and 46, the fertilizer tanks are generally oval shaped and elongate such that three tanks are shown to be fitting in a single support body 71. However, if the tanks were to be rectangular, square, or any other geometric shape, the support bodies could be varied to accommodate said geometric shape in such that the tanks will reside within the support body 71 to remain at a lower profile to allow for the clearance of the toolbar 30 and attached components when transitioning to the transport position. For example, as is shown in FIG. 5, the row unit 36, which will generally be the lower hanging portions of the toolbar 30 will need to be raised enough such that the lower portions of the row units (e.g., furrow opening and closing wheels, seed delivery systems, etc.) are raised high enough to clear the tops of the tanks 28 and any components extending therefrom. As this is intended to be at a minimum, the lower profile of the tank support basins can be varied to accommodate the varying shapes of the tanks. Thus, as is shown in FIG. 31, the tanks and portions extending therefrom, are still below the highest portion of the tongue member 12 such that normal clearance of the tongue will also satisfy the clearance of the fertilizer tanks 28 within the support members 24, 26 as well.

The tank supports can comprise generally any rigid material capable of support said tanks. For example, steel, plastic, or other combinations of materials can be utilized to support the tanks. Furthermore, while the saddle or U-shaped connecter member 70 is shown to connecting the tank supports to the tongue, it should be appreciated that other ways of attaching the tank supports to a tongue can be accomplished and are intended to be included as part of the invention. This includes welding, connection members, and the like. Furthermore, as has been disclosed, the tank supports need not be required in all configurations, as the fertilizer and/or other chemical tanks can be positioned elsewhere relative to the planter 10 to satisfy the requirements thereof.

Figure 27:
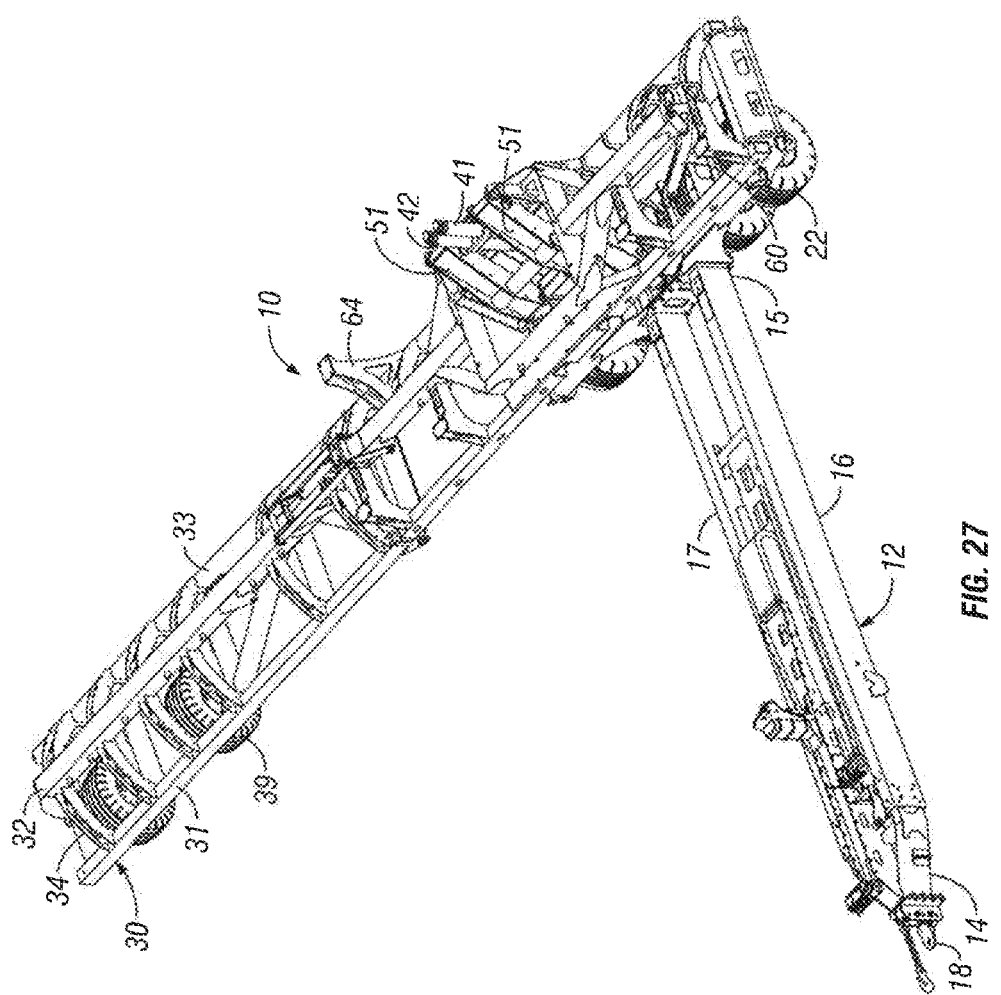
FIG. 27 is a perspective view of a section of the toolbar, frame, and tongue of an agricultural planter in a turning configuration according to aspects of the invention.

Still other advantages of the components of the invention are to be appreciated. For example, the upper and lower linkage arms 51, 52 of the lifting linkage 50 are configured to be a hose routing and take up members as well. The hoses for the various components of the planter 10 can be fed through the upper and lower linkage arms 51, 52 to provide slack and recovery of the hoses during lifting and lowering of the toolbar 30. Additionally, the hoses for the various components of the planter 10 can be routed such that they are routed behind and above the lower linkage arm 52 and in front of and above the upper member 51 and to their desired or end use location. Having them routed in such a configuration relative to the upper and lower linkage arms allows for slack and retraction of the hoses and other cables to be utilized such that the lifting and rotating of the toolbar can be accomplished without damage to the hoses or cables of the planter 10. For example, as best shown in FIG. 25, when the toolbar 30 is in a field use configuration, the upper and lower linkage arms 51, 52 are more parallel with the ground. Thus, the distance from the back to the front is at a maximum or near maximum. In such a configuration, the hose and cables will be stretched such that they are taught or in a more taught configuration such that slack is not allowing the cables to bounce around. However, as is shown in FIG. 27, when the toolbar 30 has been lifted, the linkage arms are in a more vertical configuration. Therefore, there is less distance between the portions of the linkage arms such that the hoses can be extended generally vertically about or through the linkage arms. This extension will be required such that the hoses are further away from their beginning location when lifted. In addition, when the toolbar 30 is to be rotated, having the hoses in such a configuration with the more vertical oriented linkage arms 51, 52 will allow for the rotation of the hoses and cables as well without damaging said hoses or cables.

Figure 11:
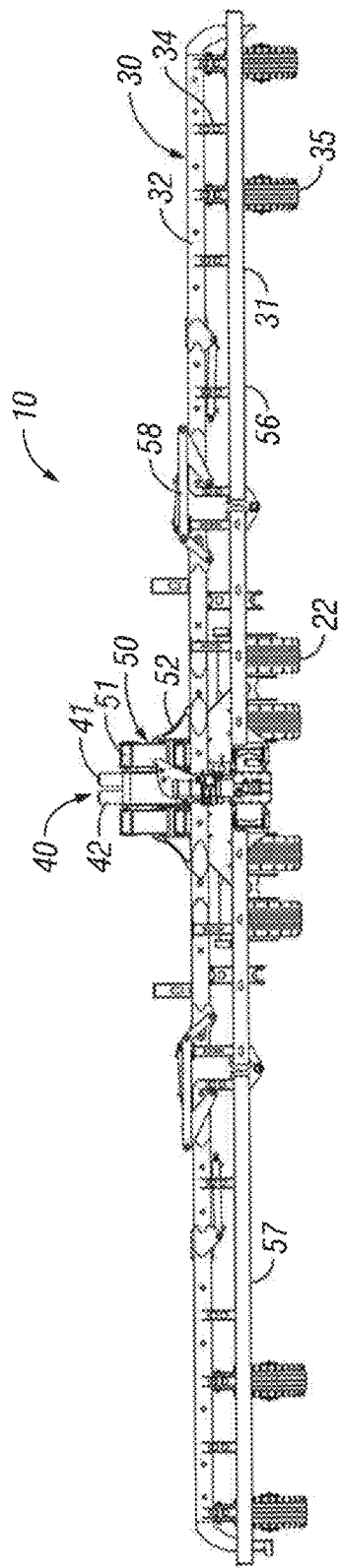
FIG. 11 is a front elevation view of the planter of FIG. 9.
Figure 12:
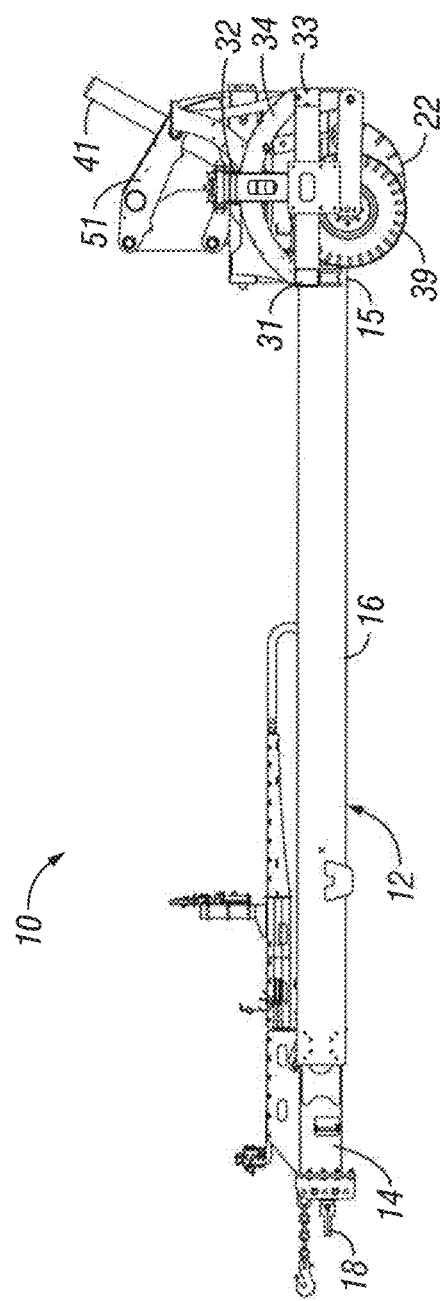
FIG. 12 is a side elevation view of the planter of FIG. 9.
Figure 13:
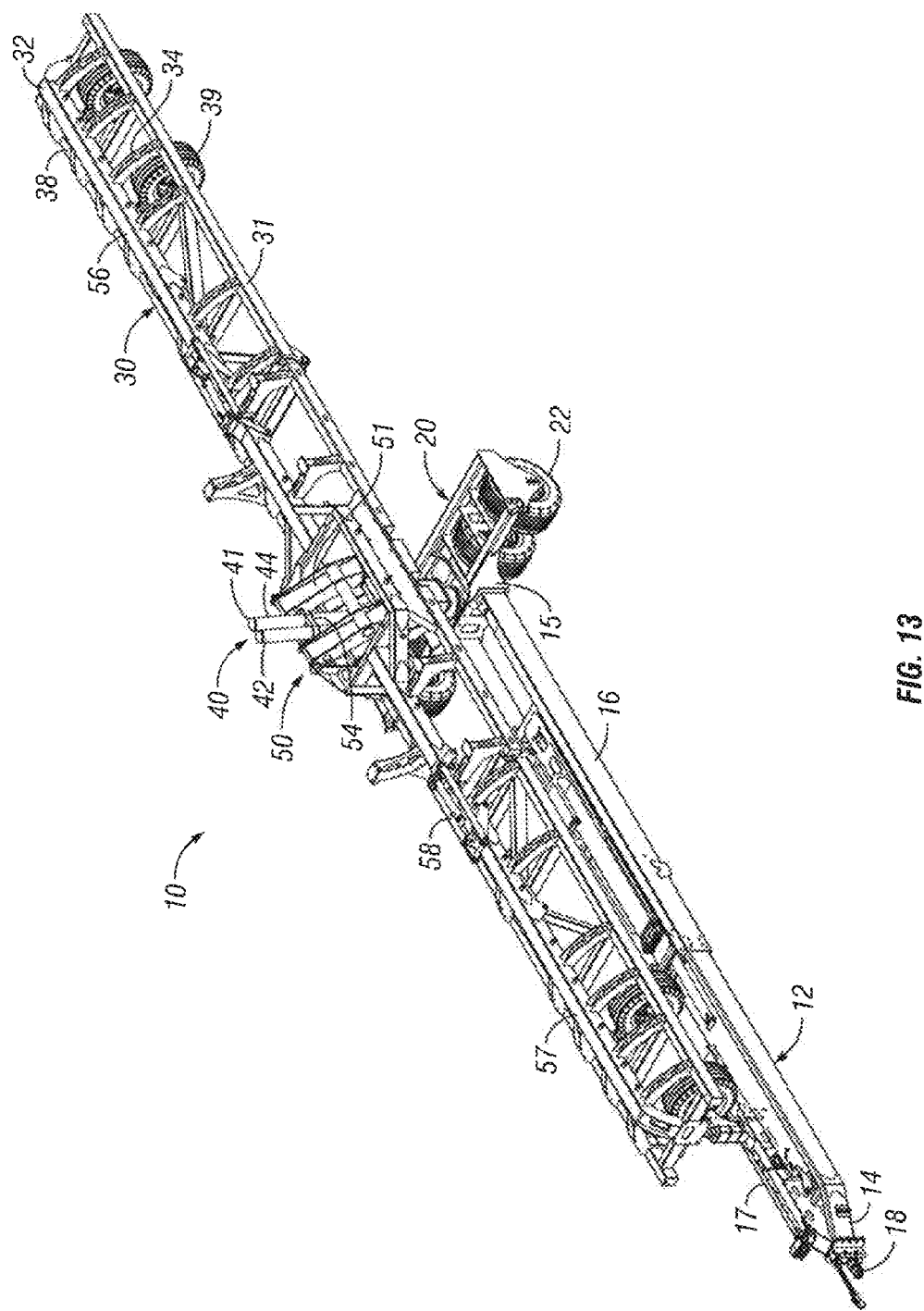
FIG. 13 is a perspective view of a frame and toolbar of an agricultural planter implement in a transport configuration according to aspects of the invention.
Figure 14:
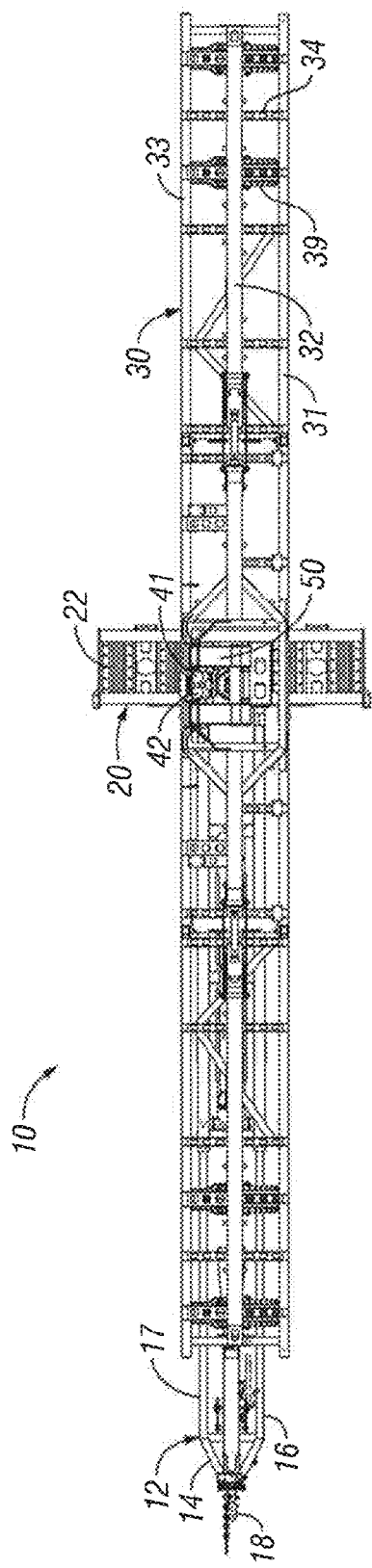
FIG. 14 is a top plan view of the planter of FIG. 13.
Figure 15:
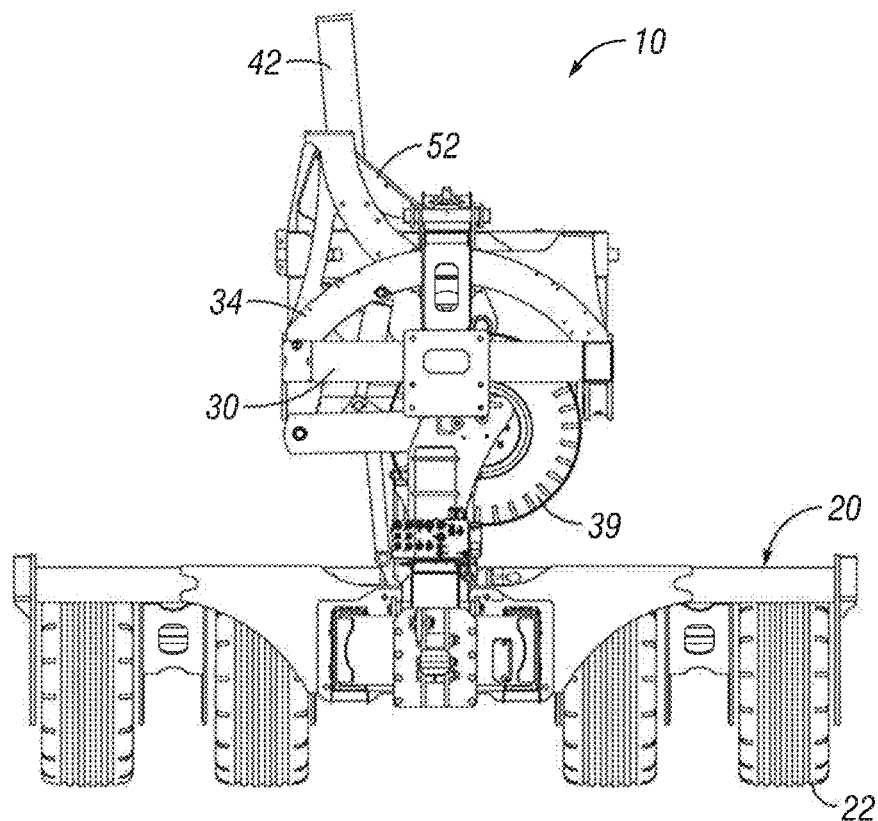
FIG. 15 is a front elevation view of the planter of FIG. 13.
Figure 16:
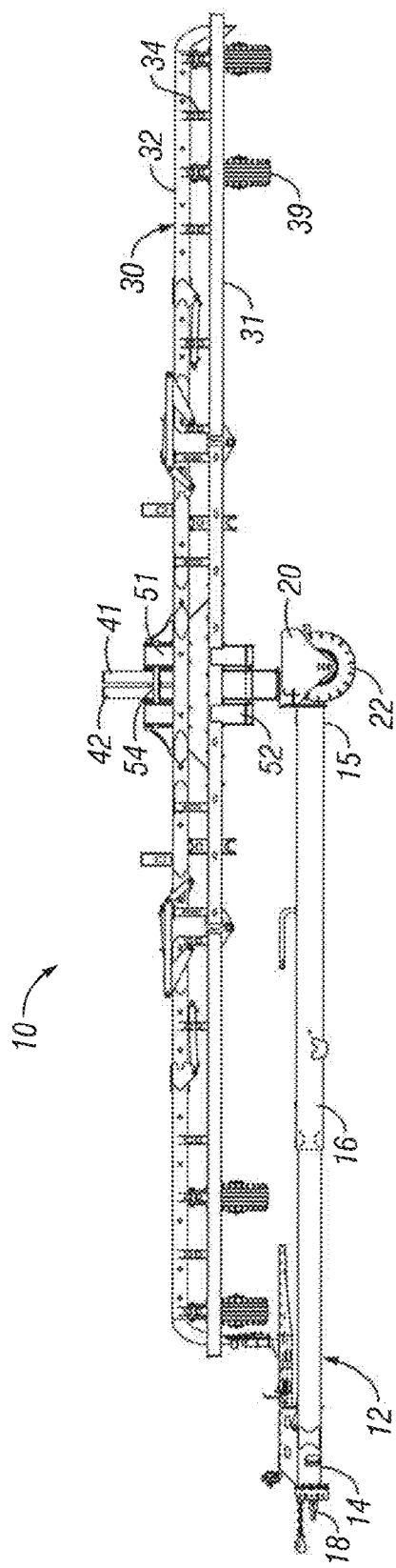
FIG. 16 is a side elevation view of the planter of FIG. 13.
Figure 17:
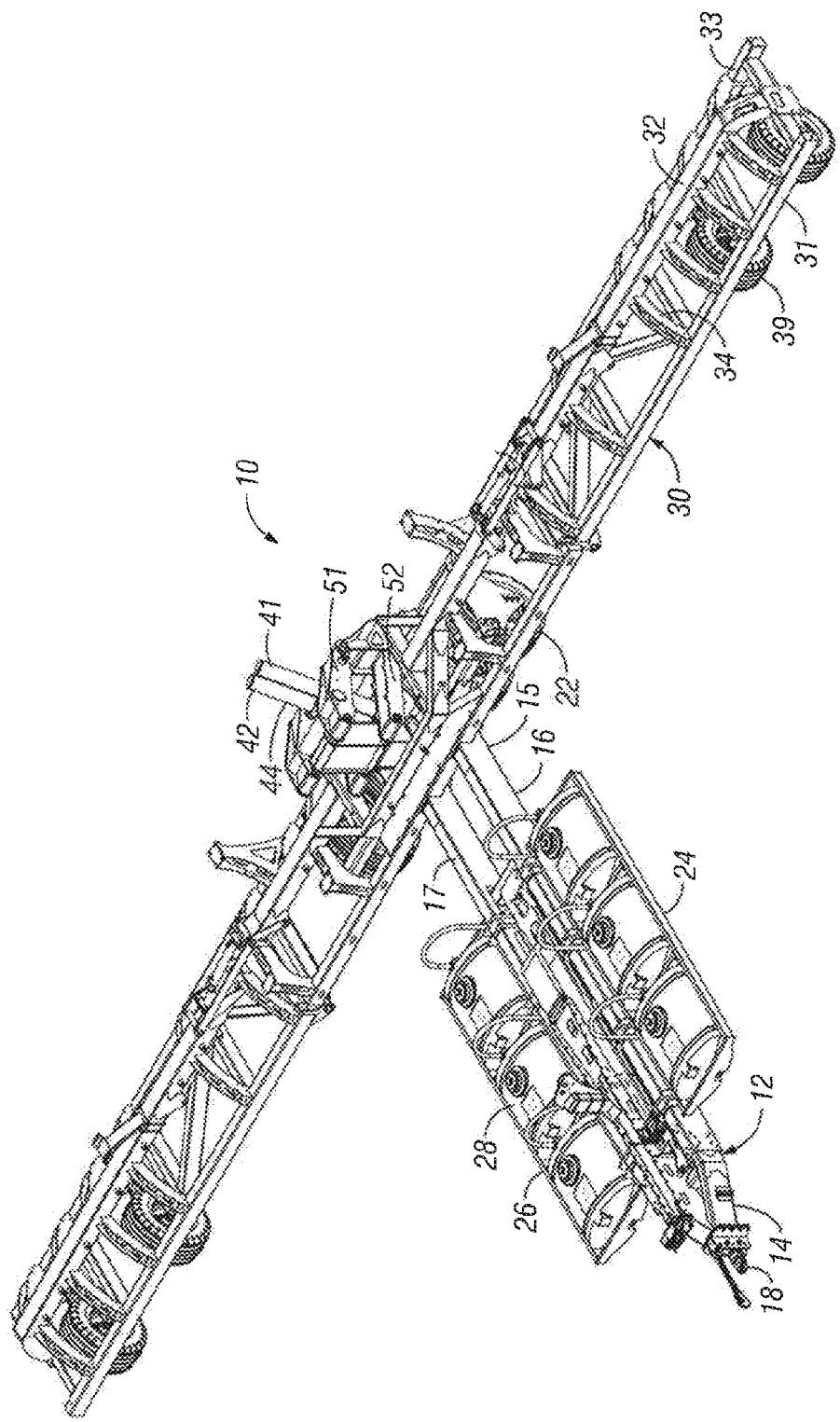
FIG. 17 is a perspective view of the planter of FIG. 13 including additional tanks and tank supports according to aspects of the invention.
Figure 18:
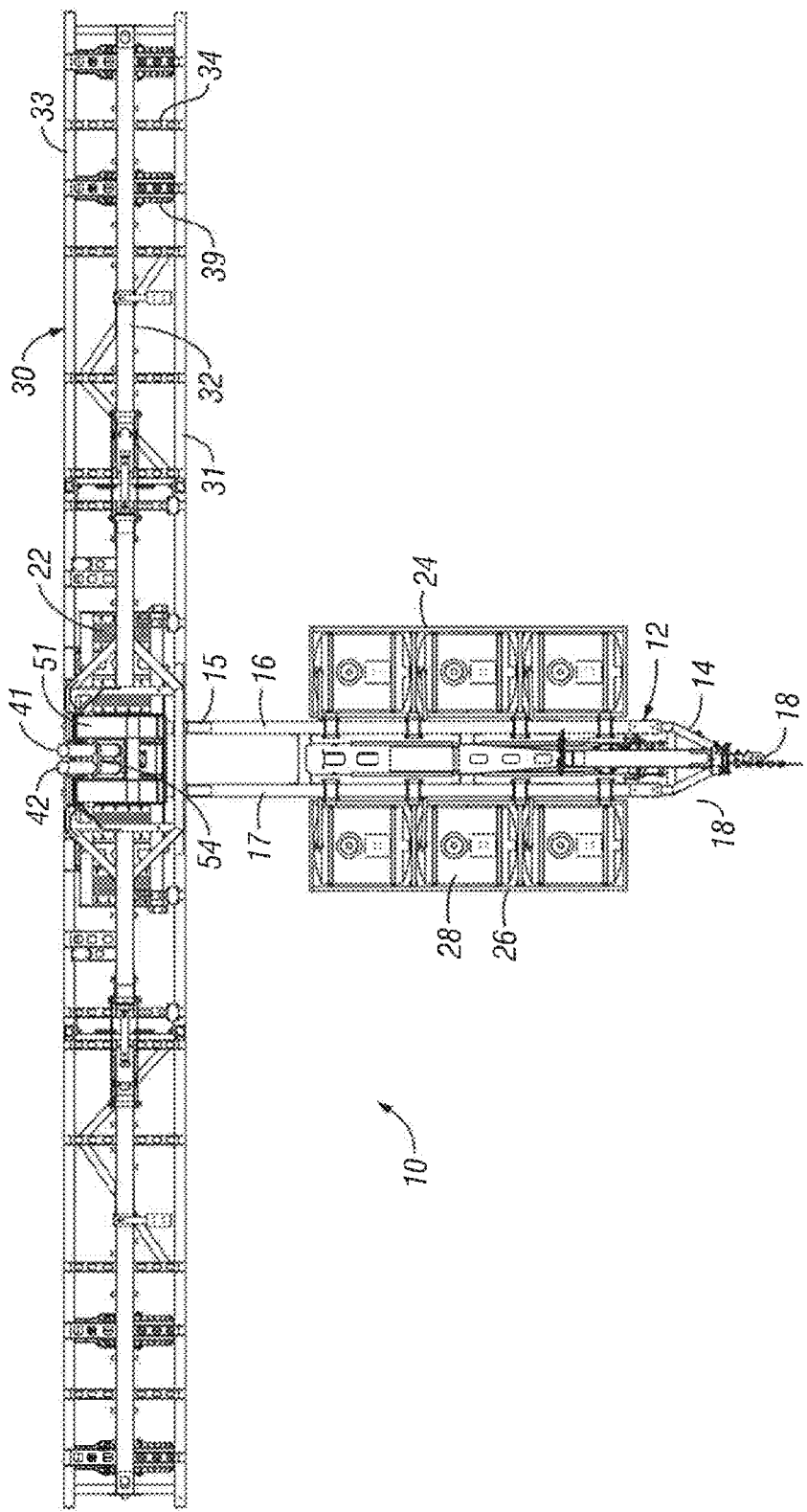
FIG. 18 is a top plan view of the planter of FIG. 17.
Figure 19:
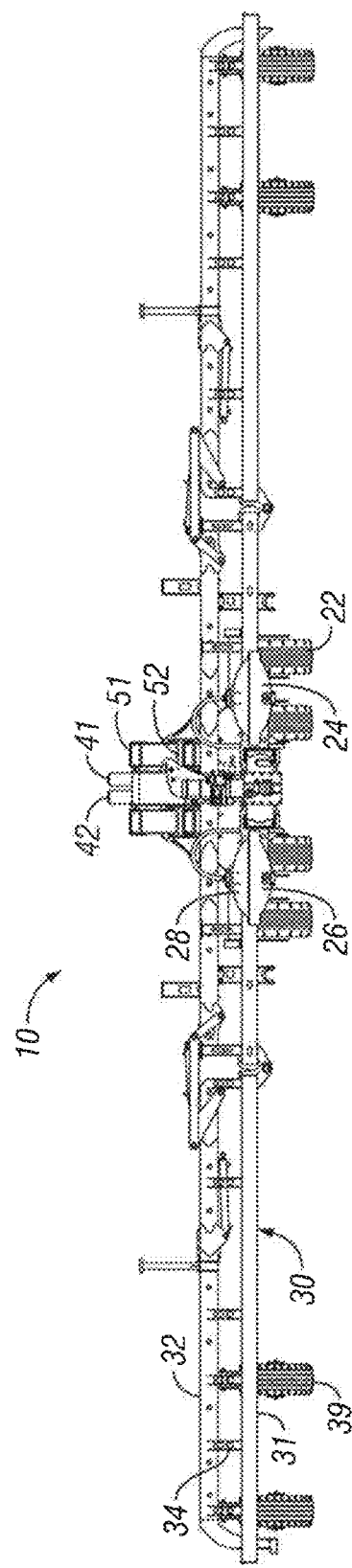
FIG. 19 is a front elevation view of the planter of FIG. 17.

It is to be appreciated that many variations can be included as part of the invention. For example, the number of row units and the width of the toolbar 30 can be varied. In addition, the toolbar 30 can include sections, such as wings. As is shown in FIG. 11, the toolbar 30 may be split having an inner section near the frame 20 as well as outer wing sections 56, 57. For example, as viewed in FIG. 11, the right side wing is known as the first wing 56, while the left side wing is known as the second wing 57. Having a solid or rigid length of toolbar along the full length of said toolbar can have a negative impact on the ability of planting of the outer row unit 36. Therefore, aspects of the invention include a break along the length of the toolbar, which is shown generally at the wing pivot 58 between the inner section of the toolbar 30 and the wing sections 56, 57. The float or pivot 58 between the outer wing sections and the inner section of the toolbar allows for the outer wings to rotate about a horizontal axis relative to the inner wing section. Furthermore, a one or more actuators can be provided at the pivot 58 to provide for downforce or down pressure at the outer wings, such as when planting on a hillside or uneven terrain. Such a down pressure configuration is shown and described in U.S. patent application Ser. No. 13/927,177, which is hereby incorporated by reference in its entirety. Still additional benefits are meant to be included with the invention.

Therefore, a lift and rotate planter has been shown and described. The numerous advantages of the varying elements of the planter 10 will be apparent to those skilled in the art. Furthermore, it is to be appreciated that the figures described herein are shown for exemplary purposes, and numerous changes, variations, or the like are intended to be included within the scope of the invention. For example, the position of the ground support tires 39, the shape and rigidity of the toolbar 30, the shape, length, and telescoping of the tongue, as well as the lifting and rotating mechanisms of the system can all be varied according to the size and need of the planter. However, the numerous aspects of the invention provide for numerous advantages over lift and rotate planters as are currently presented.

What is claimed is:

1. An agricultural planting implement having a field use configuration and a transport configuration, the implement comprising:
   a telescoping tongue with a hitch for connecting to a tow vehicle at a first end, and a frame supporting transport wheels at a second end;
   a toolbar supporting a plurality of row units and ground support tires, said toolbar at the second end of the tongue when the implement is in the field use configuration;
   a toolbar lifting assembly comprising at least one actuator connected to the frame at one end and operatively attached to the toolbar at a separate location and capable of lifting the toolbar from the field use configuration; and
   an anti-rotation link system comprising:
      at least one anti-rotation link extending from a toolbar link and configured to align with a guide located on the frame to aid in positioning the toolbar substantially transverse to the tongue when in the field use configuration, wherein the toolbar link is connected to the anti-rotation link and the toolbar; and
      an actuator having a first end connected to the anti-rotation link and a second end connected to the toolbar link, wherein the actuator is capable of providing a downforce to keep the ends of the toolbar from rotating.

2. The implement of claim 1, further comprising a rotating assembly comprising a rotating actuator extending from the frame to the toolbar, wherein extension or retraction of the actuator causes the toolbar to rotate between a position transverse the tongue and a position generally parallel to the tongue.

3. The implement of claim 1, further comprising at least one tank support operatively attached to the tongue to support one or more tanks.

4. The implement of claim 3, wherein the telescoping tongue comprises first and second telescoping members extending parallel to one another and joining near the hitch.

5. The implement of claim 4, further comprising a first tank support operatively connected to the first telescoping member, and a second tank support operatively connected to the second telescoping member.

6. The implement of claim 3, further comprising:
   at least one saddle connection securing the at least one tank support;
   at least one support body connected to and extending from the at least one saddle connection, wherein the at least one support body has a front portion, a side portion, and a rear portion; and
   a basin portion connected to the front portion and rear portion of the at least one support bodies which allows for the one or more tanks to be positioned such that the tops of the one or more tanks will be at the top of the tongue.

7. The implement of claim 1, wherein the toolbar lifting assembly further comprises a linkage assembly connecting the at least one actuator and the frame and the anti-rotation link comprises a linkage arm that travels a similar path as the linkage assembly of the toolbar lifting assembly.

8. The implement of claim 6, wherein the toolbar lifting assembly comprises first and second lifting actuators operatively connected by a trunnion, said trunnion connected at each side to a linkage arm extending between the trunnion and the toolbar for lifting and lowering the toolbar relative the frame via extension and retraction of the first and second lifting actuators.

9. The implement of claim 8, wherein the toolbar lifting assembly includes upper and lower linkage arms on each side of the trunnion.

10. The implement of claim 9, wherein one or more hoses are fed through the upper and lower linkage arms to provide slack and recovery of the hoses during lifting and lowering of the toolbar.

* * * * *